US009843638B2

(12) United States Patent
Nozaki

(10) Patent No.: US 9,843,638 B2
(45) Date of Patent: Dec. 12, 2017

(54) INFORMATION PROCESSING SYSTEM, INFORMATION PROCESSING APPARATUS, AND COMPUTER-READABLE RECORDING MEDIUM HAVING STORED THEREIN CONTROL PROGRAM FOR INFORMATION PROCESSING APPARATUS

(71) Applicant: FUJITSU LIMITED, Kawasaki-shi, Kanagawa (JP)

(72) Inventor: Hiroya Nozaki, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 360 days.

(21) Appl. No.: 14/445,435

(22) Filed: Jul. 29, 2014

(65) Prior Publication Data
US 2015/0052273 A1 Feb. 19, 2015

(30) Foreign Application Priority Data
Aug. 15, 2013 (JP) .................................. 2013-168783

(51) Int. Cl.
*G06F 12/00* (2006.01)
*H04L 29/08* (2006.01)
(52) U.S. Cl.
CPC .................................. *H04L 67/14* (2013.01)
(58) Field of Classification Search
CPC ....................................................... H04L 67/14
USPC .......................................................... 710/200
See application file for complete search history.

(56) References Cited

U.S. PATENT DOCUMENTS

| | | | |
|---|---|---|---|
| 6,785,724 B1 | 8/2004 | Drainville et al. | |
| 7,016,710 B2* | 3/2006 | Carmeli | H04W 52/0251 455/522 |
| 7,228,384 B2 | 6/2007 | Mizuno | |
| 7,406,523 B1* | 7/2008 | Kruy | H04L 67/14 709/203 |
| 8,713,193 B1* | 4/2014 | Breau | H04L 65/4092 369/47.11 |
| 8,745,245 B1* | 6/2014 | Bullock | H04L 12/2647 709/227 |
| 2004/0025067 A1* | 2/2004 | Gary | G06F 8/4432 713/300 |

(Continued)

FOREIGN PATENT DOCUMENTS

| | | |
|---|---|---|
| JP | 2003-521765 | 7/2003 |
| JP | 2004-342071 | 12/2004 |

*Primary Examiner* — Paul R Myers
(74) *Attorney, Agent, or Firm* — Fujitsu Patent Center

(57) ABSTRACT

An information processing system includes: an information processing apparatus; and a terminal device configured to communicate with the information processing apparatus using a connection established between the information processing apparatus and the terminal device. The information processing apparatus notifies the terminal device of scheduled time of release of the connection, and the terminal device determines whether or not current time has passed the scheduled time notified from the information processing apparatus at the time of transmitting a request to the information processing apparatus and, in a case where the current time is determined to have passed the scheduled time, before transmitting the request to the information processing apparatus, transmits a connection request for establishing a connection with the information processing apparatus to the information processing apparatus.

14 Claims, 20 Drawing Sheets

(56) References Cited

U.S. PATENT DOCUMENTS

| | | | |
|---|---|---|---|
| 2007/0025342 A1* | 2/2007 | Obata | H04L 45/34 370/352 |
| 2008/0228865 A1* | 9/2008 | Cruzada | H04L 67/10 709/203 |
| 2008/0228923 A1* | 9/2008 | Chidambaran | H04L 67/14 709/227 |
| 2010/0323673 A1* | 12/2010 | Etram | H04M 1/663 455/414.1 |
| 2012/0054851 A1* | 3/2012 | Piazza | H04L 63/0209 726/12 |

* cited by examiner

INFORMATION PROCESSING SYSTEM, INFORMATION PROCESSING APPARATUS, AND COMPUTER-READABLE RECORDING MEDIUM HAVING STORED THEREIN CONTROL PROGRAM FOR INFORMATION PROCESSING APPARATUS

CROSS-REFERENCE TO RELATED APPLICATION

This application is based upon and claims the benefit of priority of the prior Japanese Patent Application No. 2013-168783, filed on Aug. 15, 2013, the entire contents of which are incorporated herein by reference.

FIELD

The present invention relates to an information processing system, an information processing apparatus, and a computer-readable recording medium having stored therein a control program for an information processing apparatus.

BACKGROUND

Conventionally, client-server model software having a distributed lock function, such as a database system and a distributed file system (hereinafter, these will be collectively referred to as a distributed file system) is known. The distributed lock function is a function for controlling an access to a shared resource from a client service (hereinafter, simply referred to as a client) and, for example, is realized by a resource exclusive management subsystem such as a distributed lock manager.

FIG. 15 is a diagram that illustrates an example of a distributed lock operation, and FIG. 16 is a diagram that illustrates an example of a distributed lock operation at the time of releasing a client. In FIG. 16, a process to which the same reference sign as that illustrated in FIG. 15 is attached is the same as the process illustrated in FIG. 15, and thus, duplicated description thereof will not be presented.

In a distributed file system such as Lustre, as illustrated in FIG. 15, when a distributed lock request is received from client A in Process T110, a server service (hereinafter, simply referred to as a server) assigns a distributed lock to client A in Process T120. The client A to which the distributed lock has been assigned, for example, performs a write process for a lock range.

When a distributed lock request is received from client B in Process T130, and a collision between distributed locks of the clients A and B is detected, the server requests the client A for a distributed lock (or the return thereof) in Process T140. However, since the client A is in the middle of using the distributed lock, the client A denies return in a reply to the distributed lock request in Process T150 and returns the distributed lock to the server after the completion of the write process in Process T160.

The server assigns the returned distributed lock to client B in Process T170. The client B waiting for the assignment of the distributed lock from Process T130, for example, performs a write process in a lock range of the assigned distributed lock. Since the distributed lock request is not received from the server, the client B may omit returning the distributed lock even after the completion of the write process.

As above, the resource exclusive management subsystem of the distributed file system arbitrarily assigns an appropriate distributed lock to a processing subject, and only a client or a server to which the distributed lock is assigned can operate the resource (see "MOVEMENT OF DISTRIBUTED LOCK" in FIG. 15). Accordingly, it can be prevented that a plurality of clients issue write system calls for the same file at the same time, and each of the clients arbitrarily performs file writing. Therefore, the occurrence of a significant failure such as data destruction or data loss due to simultaneous writing for same data or file system destruction due to inconsistency of management information can be prevented.

Here, as illustrated in FIG. 16, in a case (see Process T250) where the behavior of the client is not appropriate, for example, as in a case where there is no reply (response) from the client or the like, the server releases the client (release process) (see Process T260). In the release process, the server cuts off (releases) the connection with the client by removing connection information (server-side connection information) relating to the connection with the client, the lock range, and the like from the server. Accordingly, in the distributed file system, the consistency of the entire system can be maintained.

The release process of the client is a server-initiative process and is asynchronously performed for the client. Even in a case where the server has a notification/synchronization function for the client, the release process of the client is a process with a case where the client does not respond to the server being also considered, and thus the notification to the client is not necessarily assured to be successful. In other words, the synchronization at the time of releasing the client is not assured.

FIG. 17 is a diagram that illustrates an example of a client releasing process and a release restoring process.

For example, as described above, since the release process is asynchronously performed, a client that has been released (see Process T310 illustrated in FIG. 17) on the server side is difficult to recognize the release thereof on the server side. Accordingly, there is a case where the client that has been released transmits a request to the server based on the connection information (client side) that is inconsistent with the server-side connection information that has been removed in Process T320. When the server that has received the request checks that the connection information is not present, the server returns an error to the request in Process T330. At this time, the client recognizes that the client is released on the server side, and synchronization relating to the release process of the client between the server and the client is completed.

The client that has received the error discards the client-side connection information that is in the inconsistent state and transmits a reconnection request to the server side in Process T340. Then, the client updates the connection information through a reconnection established in accordance with the reconnection request and builds the connection information that is consistent with the server, whereby the release restoring process performed by the client is completed by the client in Process T350. In other words, the release restoring process performed by the client is triggered upon the notification of an error from the server for the request that is transmitted first from the client to the server.

Here, the above-described error notified from the server is an error that is caused by inconsistency between the client-side connection information and the server-side connection information. The error may be regarded as an error (significant error) that implies a possibility of bringing a significant error such as data destruction, data loss, or file system destruction due to inconsistency of management information described above.

FIG. 18 is a diagram that illustrates an example of a rewrite process at the time of the occurrence of an error in a client, and FIG. 19 is a diagram that illustrates an example of the influence of the release of a client on an application. As illustrated in FIG. 18, when a significant error is received, the client does not perform a rewrite process but returns an error up to a process that is the original source of the issuance of the request causing the significant error. In addition, as illustrated in FIG. 18, in the case of a normal error, the client does not return the error up to the processing source but returns the process inside the system so as to perform rewrite as possibly as can.

For example, in Lustre or the like, in a case where the processing source of the request causing the significant error is a system call issued by a user application (see Process T430 illustrated in FIG. 19), the system call is returned with an error. In other words, the significant error is returned to the user application in Process T440.

While the significant error is received, and the release restoring process is started on the client side, even in the case of a process not issuing a request that directly causes the release restoring process, the same significant error is returned to the process referring to the old connection information before the release restoring process. In a case where the process is a process originated from a user application, a significant error is returned to the user application as well.

In other words, when the release of the client is performed, the possibility of returning an error to the user application increases.

A user application is an application used for performing a process desired by the user, and, in many cases, it is not considered to correctly process an error. Accordingly, even after the significant error is received, in many cases, the user application is not configured to retry the process and not correctly perform the error process. In a case where the execution of the application is automated or the like, the user does not temporarily recognize the end of the user application with an error, and the occurrence and the handling of the significant error may be frequency an obstacle to the operation of the system.

Thus, in the distributed file system such as Lustre, as illustrated in FIG. 20, there are cases where the client transmits a ping request to the server.

FIG. 20 illustrates an example of a release detection technique according to the ping. As illustrated in FIG. 20, the client transmits a ping request to the server on a regular basis (e.g., at the interval of 25 seconds) in Processes T510 and T520. Accordingly, the client can perform the release restoring process in Process T530 by being triggered upon the ping request resulting in an error in Process T520, and it can be prevented that the client that has been released is present over a long period on the server side. The possibility that the request transmitted by being triggered upon a user application in Process T540 causes the release restoring process (the possibility of generating a significant error) can be reduced.

In this method, the ping request is made completely asynchronous with the client state and the server state on a regular basis. Accordingly, from the viewpoint of the release of the client, the client-side connection information and the server-side connection information can be synchronized with each other for every transmission interval of the ping request.

As a related technology, a technology for responding to a request, which is started by a user, requesting an access to specific regional information from a remote place is known (e.g., see Japanese National Publication of International Patent Application No. 2003-521765). According to this technology, a connection is made to the Internet, an Internet protocol (IP) address that is dynamically allocated is received, the IP address is transmitted, and the connection is released when a maximal unused time is exceeded.

Furthermore, as another related technology, a cache storage device is known which issues a release request for releasing a locked area inside a storage device to the storage device in a case where there is no request from a client for a predetermined time (e.g., see Japanese Laid-open Patent Publication No. 2004-342071).

As described above, the release process of a client is performed asynchronously with the client in a server-initiated manner. In other words, the client actually transmits a request to the server, and, until an error caused by the release of the client is received from the server for the request, the client does not recognize whether the client has been released, and it is difficult for the client to perform the release restoring process. Accordingly, in a case where the transmission source of the request causing the error is a user application, there is a problem that the error is returned to the user application.

In the technique illustrated in FIG. 20, the client transmits a ping request to the server on a regular basis, and by detecting the ping request to be erroneous due to the release of the client, the release restoring process is performed. However, as the system scale increases, and the number of servers and the number of clients increase, the load of central processing units (CPUs) of the servers and the clients, the amount of memory usage, the network load, and the like due to the regular transmission of ping requests become huge.

In order to reduce the load, the ping request may be considered to be stopped. However, in a case where a request that is transmitted first after the release process causes an error and the transmission source of the request is a user application, the error is returned to the user application.

Further, in the related technologies described above, the above-described problem is not considered.

Here, while the distributed file system such as Lustre has been described as an example, the above-described problem may occur in various information processing systems in which a release process (release of a connection) of a terminal device that is performed by an information processing apparatus is performed asynchronously with the terminal device.

SUMMARY

According to an aspect of the embodiments, an information processing system includes: an information processing apparatus; and a terminal device configured to communicate with the information processing apparatus using a connection established between the information processing apparatus and the terminal device. The information processing apparatus includes a first processor, and the first processor notifies the terminal device of scheduled time of release of the connection. In addition, the terminal device includes a second processor, and the second processor determines whether or not current time has passed the scheduled time notified from the information processing apparatus at the time of transmitting a request to the information processing apparatus and, in a case where the current time is determined to have passed the scheduled time, before transmitting the request to the information processing apparatus, transmits a connection request for establishing a connection with the information processing apparatus to the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
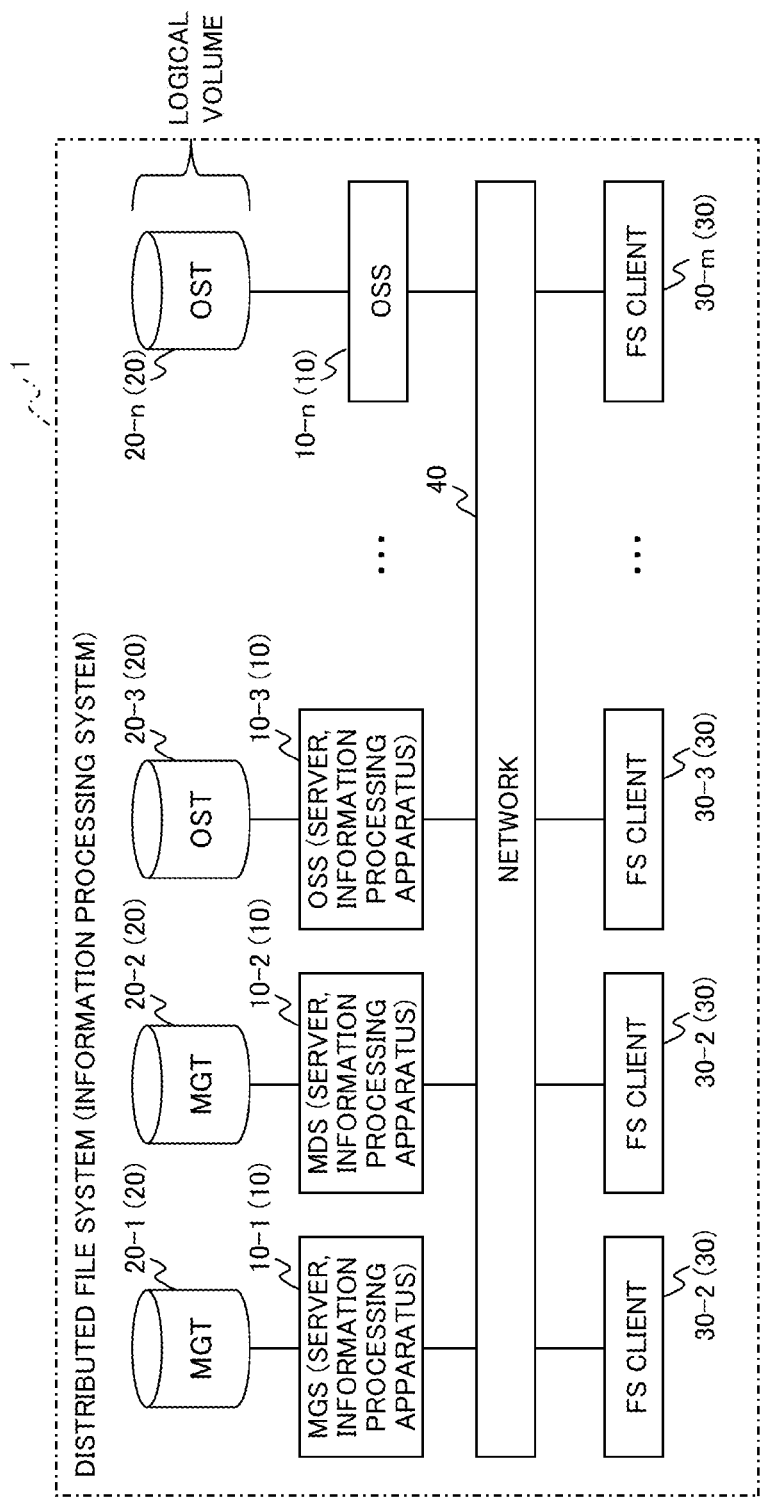
FIG. 1 is a diagram that illustrates an example of the configuration of a distributed file system according to an embodiment as an example.

Hereinafter, embodiments will be described with reference to the drawings.

[1] Embodiment

[1-1] Distributed File System

As described above, in a case where a client (hereinafter, referred to as client A) does not response to a request from a server for a certain reason, a distributed lock assigned to client A is not returned to a resource exclusive management subsystem. As a result, the entire distributed file system (a server and all the other clients) is in a state in which the process is difficult to be performed for a file system resource that is exclusively used by the distributed lock.

Meanwhile, in a case where the resource exclusive management subsystem forcibly advances the process by handing over the distributed lock held by client A to another client (hereinafter, referred to as client B) or the like, there are cases where client A is returned and resumes the process. At this time, client A contends with client B to which the lock is newly assigned, and there is a possibility of the occurrence of data destruction or the like.

In order to prevent such a situation, in a case where client A to which the distributed lock is assigned is determined to have gone down, at the time point, the server invalidates all the information relating to client A. For example, in Lustre, the server cuts off a connection with client A by invalidating the distributed lock assigned to client A and a cached inode, flashing all the data when there is cached data, and the like. In other words, the server releases the client (in some cases, the term "evict (or eviction)" may be used as the term "release").

For example, in a case where a device in which client A operates goes down, and accordingly, client A does not respond to a request from the server, client-side connection information maintained by client A before going down is lost. Accordingly, when the client is restarted in accordance with the restart of the device, and the client transmits a connection request to the server, the system (server) performs the process as if a new client (hereinafter, client C) transmits a connection request. As above, even when the release of client A occurs in advance on the server side until the device goes down, is restarted, and mounts client C, information relating to client A is removed from both the server and the client. Accordingly, as described above, in a case where the device goes down, data consistency of the distributed file system is maintained.

However, there are also cases where client A has not actually gone down even when the server determines that client A has gone down and performs a release process of the client. Such cases, for example, include a case where client A and the server are temporarily incommunicable with each other due to a network error and a case where the client A side is in a state in which a communication process is difficult to be performed due to a high load of the CPU or memory insufficiency. In such cases, while client A maintains connection information, the connection information is not present on the server side. In other words, a state is formed in which the connection information is not consistent between client A and the server.

Accordingly, in a case where client A is in a state (a state being not consistent with the server) maintaining connection information not present on the server, in order to newly rewrite the connection information, it is preferable that client A perform a release restoring process by being triggered upon something.

Thus, a distributed file system 1 according to an embodiment performs the process to be described in detail below.

[1-2] Configuration of Distributed File System

Hereinafter, the configuration of the distributed file system (information processing system) 1 according to an embodiment as an example will be described with reference to FIGS. 1 and 2.

Figure 2:
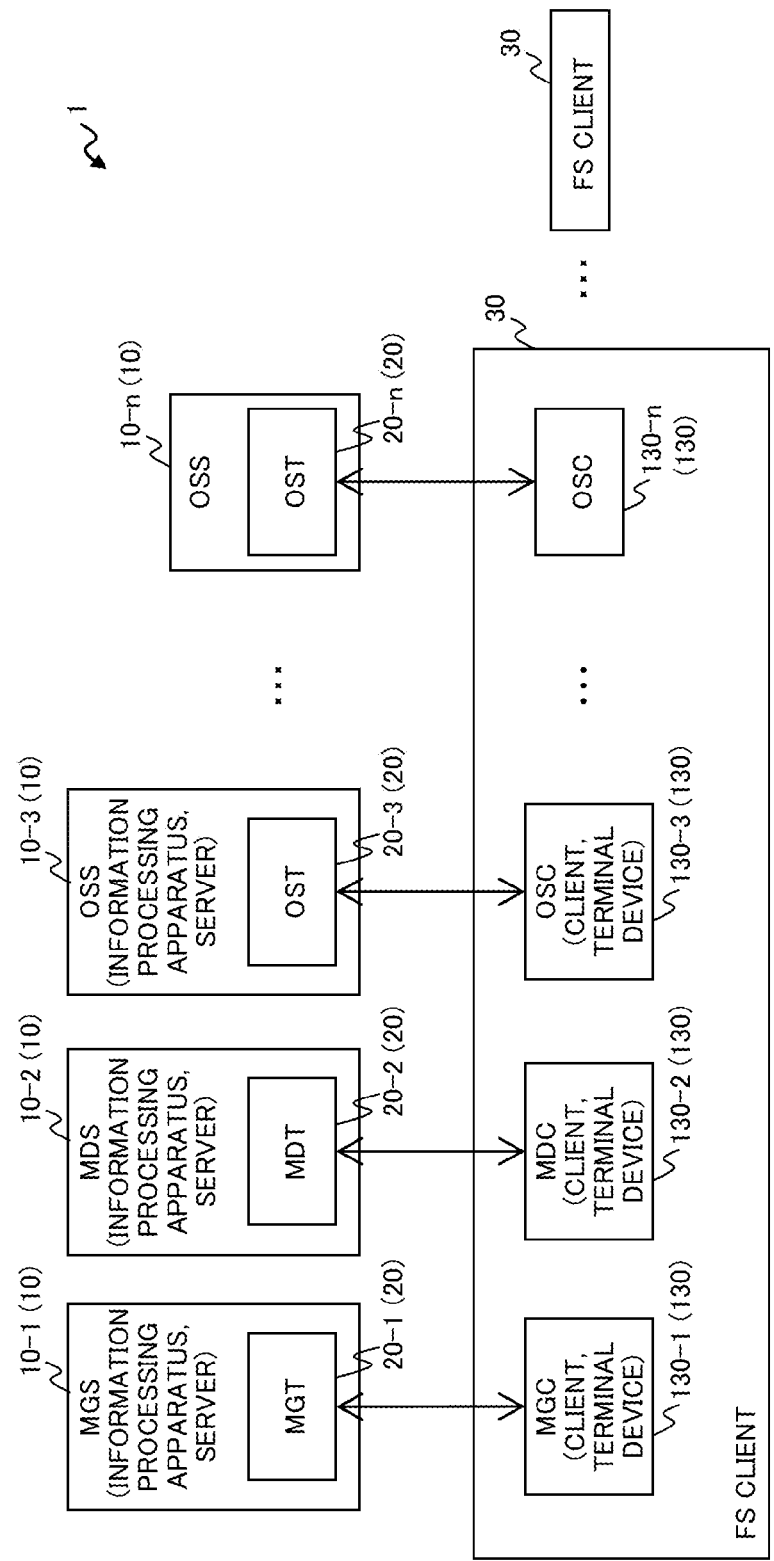
FIG. 2 is a diagram that illustrates an example of the configuration of the distributed file system with focusing on an FS client illustrated in FIG. 1.

FIG. 1 is a diagram that illustrates an example of the configuration of the distributed file system 1 according to the embodiment as an example, and FIG. 2 is a diagram that illustrates an example of the configuration of the distributed file system 1 with focusing on a file system (FS) client 30 illustrated in FIG. 1.

As illustrated in FIG. 1, the distributed file system 1 includes: a management server (MGS) 10-1; a meta data server (MDS) 10-2; and (n−2) (here, n is an integer of two or more) object storage servers (OSS) 10-3 to 10-*n*. The distributed file system 1 further includes: a management target (MGT) 20-1, a meta data target (MDT) 20-2; and (n−2) object storage targets (OST) 20-3 to 20-*n*. Furthermore, the distributed file system 1 includes: m (here, m is an integer of "0" or more) FS clients 30-1 to 30-*m*; and a network 40.

Hereinafter, in a case where the MGS 10-1, the MDS 10-2, and the OSS's 10-3 to 10-*n* do not need to be discriminated from one another, each thereof will be simply referred to as a server service (a server or an information processing apparatus) 10. In a case where the MGT 20-1, the MDT 20-2, and the OST's 20-3 to 20-*n* do not need to be discriminated from one another, each thereof will be simply referred to as a logical volume 20.

As the distributed file system 1, for example, a file system using Lustre-1.8 Edition may be used.

In a system assumed as the distributed file system 1, the ratio between the number of servers and the number of FS clients through a network layer is n:m. As illustrated in FIG. 1, a plurality of servers 10 and a plurality of FS clients 30 are positioned on the network layer (network 40) and configure the one distributed file system 1 while communicating with each other.

As illustrated in FIG. 1, each of the plurality of servers 10 of the distributed file system 1 manages one individual logical volume 20.

The MGT 20-1 is a logical volume that maintains configuration information of the distributed file system 1, and the MGS 10-1 is a server that manages the MGT 20-1.

The OST's 20-3 to 20-*n* are logical volumes that maintain data (files and objects) such as texts and calculation results, and the OSS's 10-3 to 10-*n* are servers that respectively manage the OST's 20-3 to 20-*n*.

The MDT 20-2 is a logical volume that maintains meta-data such as update times and file sizes of files maintained by the OST's 20-3 to 20-*n*, and the MDS 10-2 is a server that manages the MDT 20-2.

Each FS client 30, as illustrated in FIG. 2, includes client services (clients) corresponding to the number of servers. More specifically, each FS client 30 includes: a management client (MGC) 130-1; a meta data client (MDC) 130-2; and (n−2) object storage clients (OSC) 130-3 to 130-*n*.

Hereinafter, in a case where the MGC 130-1, the MDC 130-2, and the OSC's 130-3 to 130-*n* do not need to be discriminated from one another, each thereof will be simply referred to as a client service (a client or a terminal device) 130.

The MGC 130-1 is responsible for a request process for the MGS 10-1, the MDC 130-2 is responsible for a request process for the MDS 10-2, and the OSC's 130-3 to 130-*n* are respectively responsible for request processes for the OSS's 10-3 to 10-*n*.

In other words, in the distributed file system 1 illustrated in FIG. 1 in which the number of servers is n, and, the number of FS clients is m, the ratio between the number of the servers and the number of the clients is n:(n*m) (see FIG. 2).

Here, when focusing on one client 130, the target communication opponent of the client 130 is only one server 10. Hereinafter, a description will be presented with a one-to-one connection setup method of the server 10 and the client 130 focused on.

[1-3] Distributed File System

Here, the distributed file system 1 according to the embodiment will be briefly described.

As described above, in the released client, when a request from a user application is transmitted to the server, an error is returned to the user application from the server. Here, the released client represents a client that has not issued any request after the release of the client on the server side for which a release restoring process has not been performed.

Figure 20:
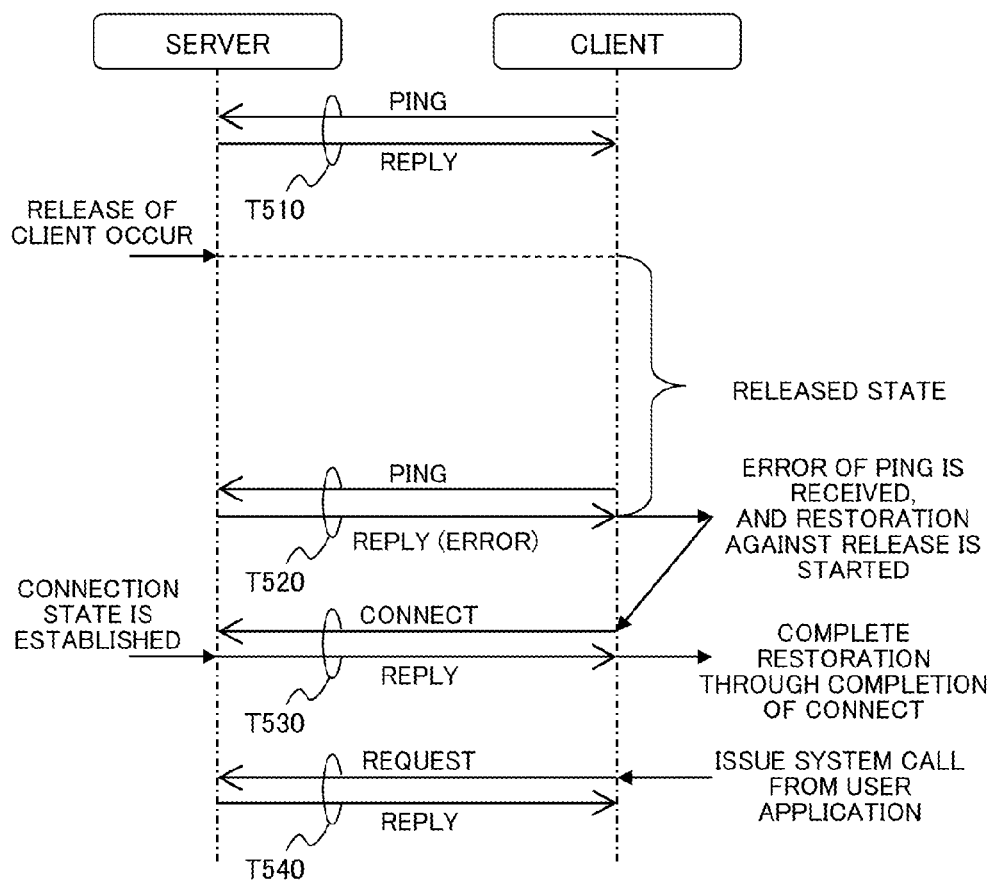
FIG. 20 is a diagram that illustrates an example of a release detection technique using a ping.

In the technique illustrated in FIG. 20, as the system scale increases, and the number of servers and the number of clients increase, the load of the information processing system according to the regular transmission of ping requests becomes huge.

In contrast to this, the distributed file system 1 according to the embodiment solves the above-described disadvantages by performing the following processes (i) to (iii).

(i) The server (information processing apparatus) 10 notifies the client 130 of scheduled release time (scheduled time) at which the connection with the client (terminal device) 130 is released.

(ii) When transmitting a request to the server 10, the client 130 determines whether or not the current time has passed the scheduled release time notified from the server 10.

(iii) In a case where the current time is determined to have passed the scheduled release time, the client 130 transmits a connection request used for establishing a connection with the server 10 to the server 10 before transmitting a request to the server 10.

According to the processes (i) to (iii) described above, the distributed file system 1 causes both the server 10 side and the client 130 side to have the same scheduled release time, and, by using the scheduled release time, the server 10 side and the client 130 side can be synchronized with each other.

As above, in the distributed file system 1, the server 10 side can cause the client 130, which is in the released state, to recognize that the client is released by the server 10 at the time of transmitting a request after the scheduled release time (a chance for performing the release restoring process is given). Accordingly, before transmitting a request, after a new connection is established by the release restoring process (after new connection information that coincides with that of the server 10 side is generated), the client 130 can transmit the request.

Accordingly, in the client 130, the occurrence of a significant error that is caused by referring to the old client-side connection information corresponding to the server-side connection information that has already been removed in the server 10 can be suppressed, and accordingly, the probability of returning an error to the user application can be reduced.

Since the regular transmission of ping requests is not performed, the load (processing load) of the distributed file system 1 can be smaller than that according to the technology represented in FIG. 20.

As above, according to the distributed file system 1, the frequency at which an error is returned to the user application is reduced, and a connection between the server 10 and the client 130 can be established again while an increase in the load of the system 1 is suppressed.

[1-4] Hardware Configuration

Figure 3:
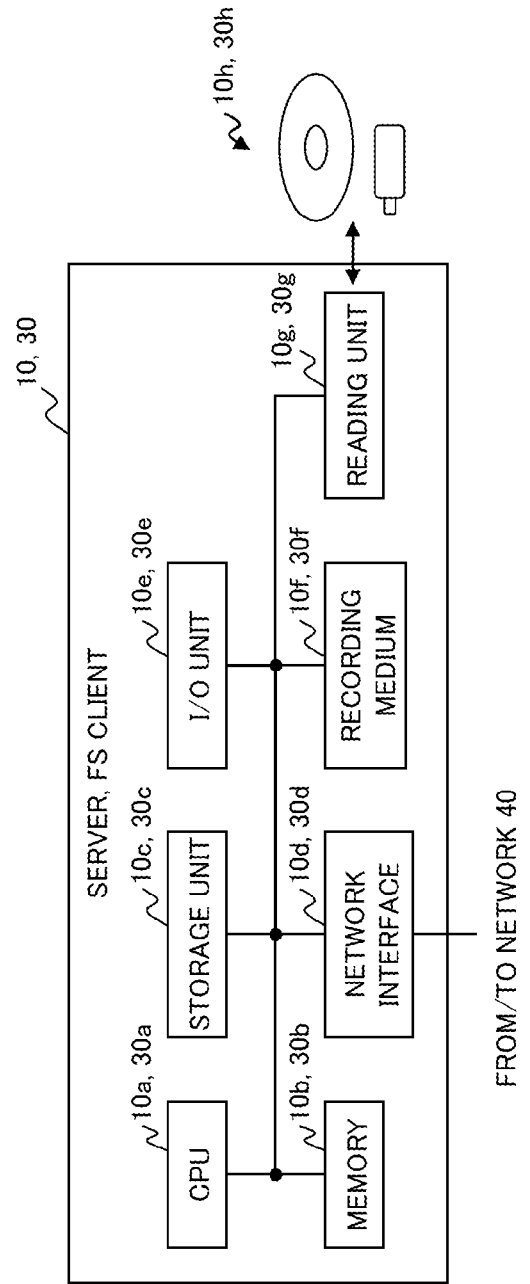
FIG. 3 is a diagram that illustrates an example of the hardware configuration of a server and the FS client illustrated in FIG. 1.

Next, the hardware configuration of the distributed file system 1 will be described with reference to FIG. 3. FIG. 3 is a diagram that illustrates an example of the hardware configuration of the server 10 and the FS client 30 illustrated in FIG. 1.

The server 10 and the FS client 30, as illustrated in FIG. 3, respectively include: CPUs 10a and 30a; memories 10b and 30b; storage units 10c and 30c; network interfaces 10d and 30d; and I/O units 10e and 30e. The server 10 and the FS client 30, as illustrated in FIG. 3, further include recording media 10f and 30f and reading units 10g and 30g respectively.

The CPU 10a or 30a is connected to corresponding blocks 10b to 10g or 30b to 30g illustrated in FIG. 3 and is a processing device (processor) that performs various control processes and calculation processes. The CPU 10a or 30a executes a program stored in the memory 10b or 30b, the recording medium 10f or 30f, a read only memory (ROM) not illustrated in the figure, or the like, thereby realizing various functions of the server 10 or the FS client 30.

The memory 10b or 30b is a storage device that temporarily stores various data and programs. When a program is executed, the CPU 10a or 30a stores and expands data and the program in the memory 10b or 30b. As the memory 10b or 30b, for example, a volatile memory such as a random access memory (RAM) is used.

The storage unit 10c or 30c is hardware that stores various data and programs. As the storage unit 10c or 30c, for example, any one of various devices including a magnetic disk device such as a hard disk drive (HDD), a semiconductor drive device such as a solid state drive (SSD), a non-volatile memory such as a flash memory, and the like is used.

The network interface unit 10d or 30d controls the connection and the control between the server 10 and the network 40 or the FS client 30 and the network 40 in a wired or wireless manner. As the network interface unit 10d or 30d, for example, a network controller such as a local area network (LAN) card supporting the Transmission Control Protocol (TCP)/IP is used. As the network interface unit 10d or 30d, for example, a host channel adapter (HCA) such as InfiniBand (registered trademark) or a fiber channel controller may be used.

The I/O unit 10e or 30e, for example, includes at least one of an input device such as a mouse or a keyboard and an output device such as a display or a printer. The I/O unit 10e or 30e receives an operation command according to an operation or the like of an operator (supervisor) or a user of the server 10 or the FS client 30 using the input device and displays (outputs) a processing result such as a monitoring result acquired by the server 10 or the FS client 30 to the output device.

The recording medium 10f or 30f is a storage device such as a flash memory or a ROM and records various data and programs. The reading unit 10g or 30g is a device that reads data or a program recorded in a computer-readable recording medium 10h or 30h such as an optical disk or a universal serial bus (USB) memory.

In at least one of the recording media 10f and 10h, a control program realizing the function of the server 10 according to this embodiment may be stored, and, in at least one of the recording media 30f and 30h, a control program realizing the function of the FS client 30 may be stored. For example, the CPU 10a or 30a expands a control program read from the recording medium 10f or 30f or a control program read from the recording medium 10h or 30h through the reading unit 10g or 30g in the storage device such as the memory 10b or 30b and executes the control program. Accordingly, the computer as the server 10 and the computer as the FS client 30 realize the functions of the server 10 and the FS client 30 according to this embodiment by using the CPUs 10a and 30a.

The above-described blocks 10a to 10g and the blocks 30a to 30g are respectively communicably interconnected through a bus.

The above-described hardware configuration of the distributed file system 1 is an example. Accordingly, an increase/decrease or the division of the hardware, integration according to an arbitrary combination thereof, or the like inside the individual storage system 1, the server 10, or the FS client 30 may be appropriately performed. For example, the hardware of the server 10 illustrated in FIG. 3 may be used to be common to one or more servers 10, and the hardware of the FS client 30 illustrated in FIG. 3 may be used to be common to one or more FS clients 30.

The logical volume 20 illustrated in FIG. 1 is realized by a storage area of the storage device, which is not illustrated in the figure, mounting a plurality of physical volumes therein, a storage area of the storage unit 10c, or the like.

[1-5] Detailed Configuration of Distributed File System

[1-5-1] Configuration of Server

Figure 4:
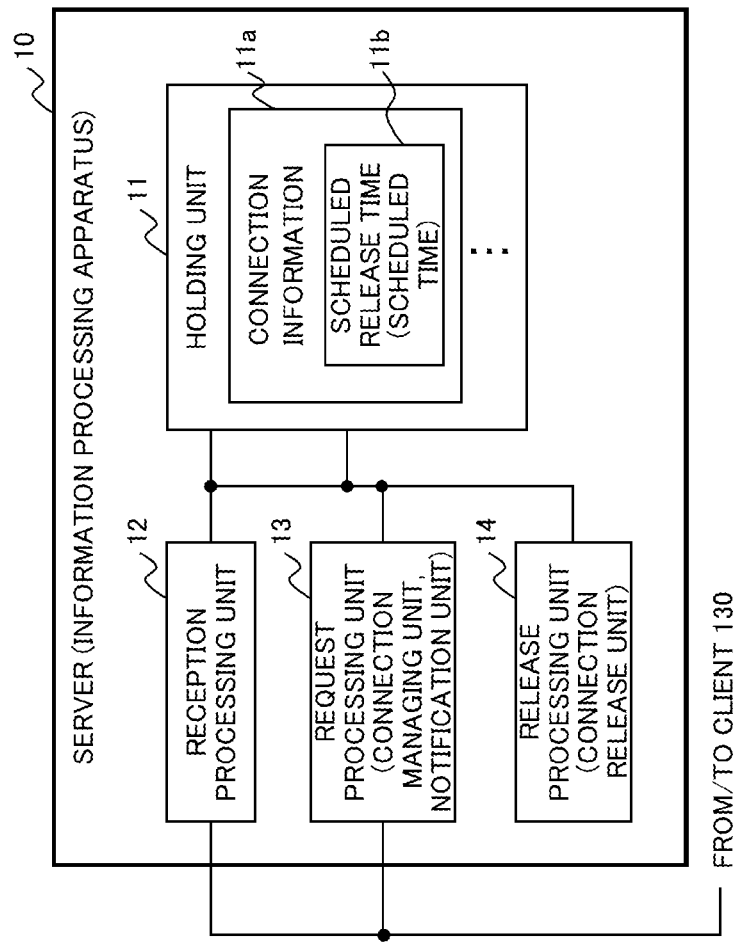
FIG. 4 is a diagram that illustrates an example of the functional configuration of the server illustrated in FIG. 1.

Next, the configuration of the server 10 according to the embodiment as an example will be described with reference to FIG. 4. FIG. 4 is a diagram that illustrates an example of the functional configuration of the server 10 illustrated in FIG. 1.

As described above, the server 10 has a function of the MGS 10-1, the MDS 10-2, or the OSS's 10-3 to 10-n and provides services to the clients 130 that have established connections.

The server 10 according to the embodiment includes a holding unit 11, a reception processing unit 12, a request processing unit 13, and a release processing unit 14.

The holding unit 11, for each client 130, holds connection information 11a relating to the client 130 and, for example, is realized by the memory 10b, the storage unit 10c, or the like.

In the connection information 11a, connection management information and resource exclusive management information are included. The connection management information is information relating to a connection with the client 130, and the resource exclusive management information is information relating to a structure body (e.g., a lock range of the resource) used for exclusive control and resources tied thereto.

The connection information 11a includes scheduled release time (scheduled time) 11b at which the client 130 is released (the connection with the client 130 is released).

Figure 5:
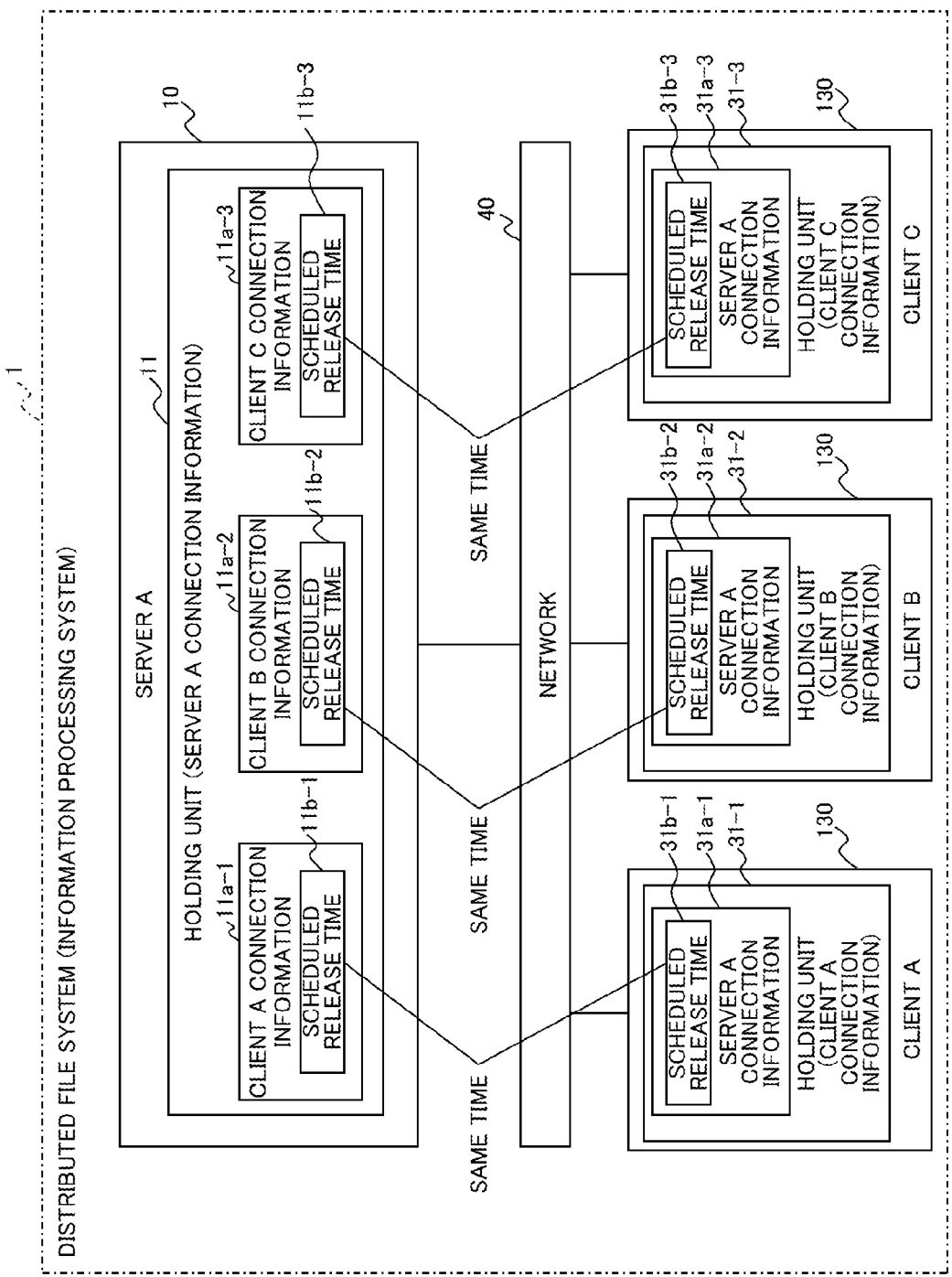
FIG. 5 is a diagram that illustrates scheduled release time maintained by the server and the client according to an embodiment as an example.

FIG. 5 is a diagram that illustrates the scheduled release time maintained by the server 10 and the client 130 according to the embodiment as an example.

For example, as illustrated in FIG. 5, a case will be described in which the server 10 (in the description of FIG. 5, for the convenience of description, referred to as server A) has established connections with three clients 130 (in the description of FIG. 5, for the convenience of description, referred to as clients A to C). In such a case, server A causes the holding unit 11 to hold the connection information 11a of all the clients 130 that have established connections with server A, in other words, connection information 11a-1 of client A, connection information 11a-2 of client B, and connection information 11a-3 of client C. In the connection information 11a-1 to 11a-3 maintained by server A, scheduled release times 11b-1 to 11b-3 of clients A to C are included.

The reception processing unit 12 receives information of a connection request from the client 130, various requests such as a request of write/read, and the like, determines whether the connection request and the various requests are in accordance with the connection information 11a maintained by the server 10, and performs a predetermined process according to a result of the determination.

For example, when a connection request is received, the reception processing unit 12 determines whether or not the connection information 11a relating to the client 130 that is the transmission source of the connection request is held in the holding unit 11. In a case where the connection information is not maintained, in order to newly generate the connection information 11a relating to the client 130, the reception processing unit 12 transfers the connection request to the request processing unit 13.

On the other hand, in a case where the connection information 11a relating to the client 130 is held in the holding unit 11, the reception processing unit 12 determines whether or not the current time has passed the scheduled release time 11b. In a case where the current time has not passed the scheduled release time 11b, the reception processing unit 12 causes the request processing unit 13 to return an error to the client 130. On the other hand, in a case where the current time has passed the scheduled release time 11b, in order to remove the existing connection information 11a relating to the client 130, the reception processing unit 12 transmits a predetermined signal to the release processing unit 14. After the signal is transmitted, in order to newly generate the connection information 11a relating to the client 130, the reception processing unit 12 transfers the connection request to the request processing unit 13.

When any one of various requests such as a request of write/read, and the like other than the connection request is received from the client 130, the reception processing unit 12 determines whether or not the connection information 11a relating to the client 130 that is the transmission source of the request is held in the holding unit 11. In a case where the connection information is not held, the reception processing unit 12 causes the request processing unit 13 to return an error to the client 130.

On the other hand, the connection information 11a relating to the client 130 is held in the holding unit 11, the reception processing unit 12 transfers the request from the client 130 to the request processing unit 13.

The request processing unit 13 performs management of the connection information 11a and the scheduled release time 11b, a process according to the connection request or any one of the various requests received by the reception processing unit 12, generation and transmission of a reply, and the like.

For example, when a connection request or any one of the various requests is transferred from the reception processing unit 12, the request processing unit (connection managing unit) 13 acquires the scheduled release time 11b. Then, the request processing unit 13 manages the scheduled release time 11b in association with the connection information 11a relating to the client 130 that is the transmission source of the connection request or the any one of the various requests.

More specifically, when the connection request is transferred from the reception processing unit 12, the request processing unit 13 generates new connection information 11a relating to the client 130 and maintains the generated connection information 11a in the holding unit 11 in association with the client 130. Then, the request processing unit 13 performs a predetermined process according to the connection request, calculates the scheduled release time 11b, and records the calculated scheduled release time 11b in the generated connection information 11a.

When any one of the various requests is transferred from the reception processing unit 12, the request processing unit 13 performs a predetermined process (e.g., a write process/a read process, and the like) according to the request, updates the scheduled release time 11b, and records the updated scheduled release time 11b in the connection information 11a relating to the client 130.

Then, the request processing unit 13 generates a reply, which has various kinds of information being stored in a data section thereof, to the connection request or the any one of the various requests and transmits the generated reply to the client 130 that is the transmission source of the connection request or the any one of the various requests.

Here, when a connection request or any one of the various requests is received from the client 130, the scheduled release time 11b is acquired (calculated and updated) by the request processing unit 13 by adding a predetermined time (e.g., 25 seconds) to the current time.

The request processing unit (notification unit) 13 transmits the acquired scheduled release time 11b to the client 130 that is the transmission source of the connection request or the any one of the various requests.

Figure 6:
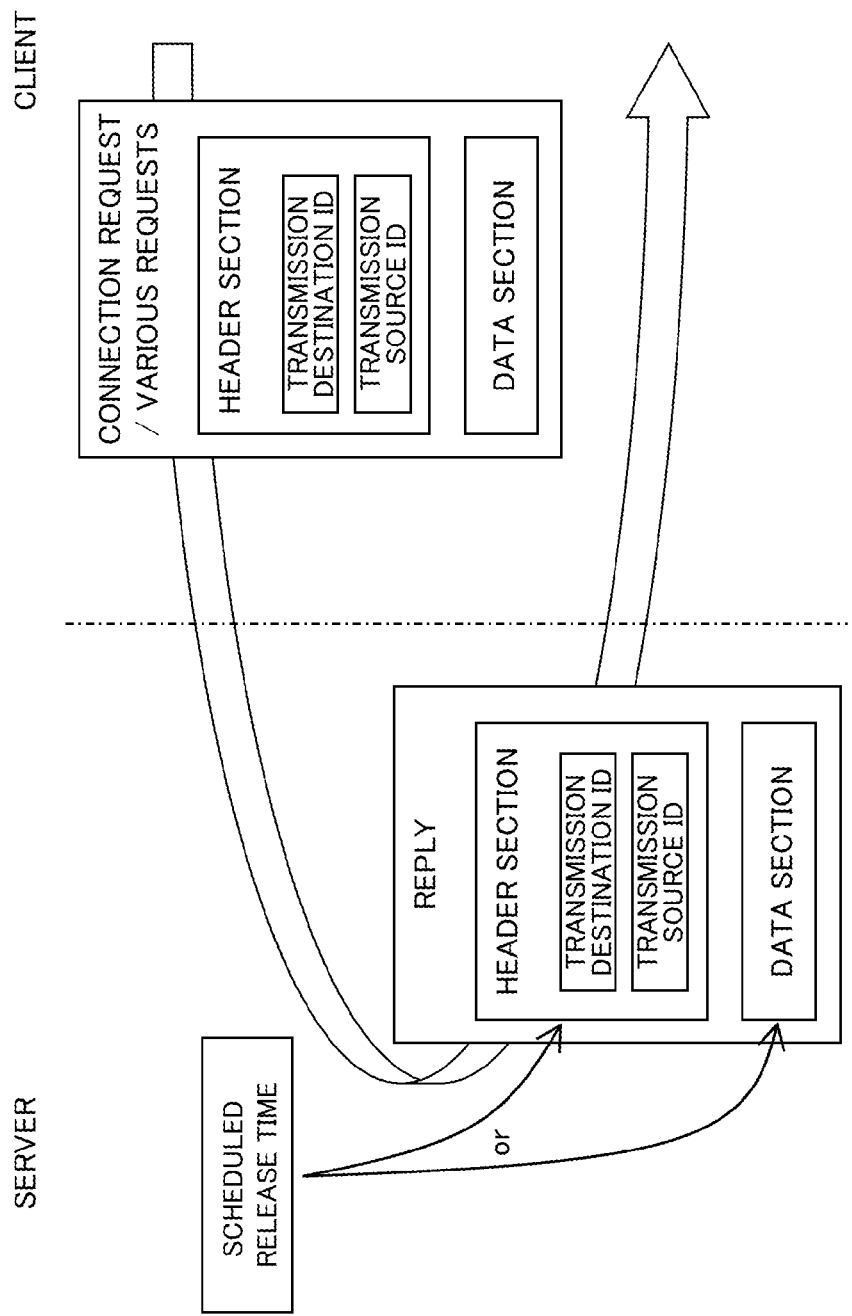
FIG. 6 is a diagram that illustrates an example of a technique for giving a notification of scheduled release time that is made by a request processing unit illustrated in FIG. 4.

FIG. 6 is a diagram that illustrates an example of a technique for giving a notification of the scheduled release time 11b that is made by the request processing unit 13 illustrated in FIG. 4.

For example, the server 10 (the request processing unit 13), as illustrated in FIG. 6, can set (include) the scheduled release time 11b in the reply (e.g., a header section or a data section) to the connection request or any one of various requests received from the client 130 and transmit the reply. In other words, the process of acquiring the scheduled release time 11b performed by the request processing unit 13 may be performed when a reply is transmitted (generated) to the client 130. In a case where the scheduled release time 11b is acquired when the reply is transmitted (generated), the current time is time when the reply is transmitted (generated).

As illustrated in FIG. 6, a transmission destination ID and a transmission source ID used for uniquely determining the transmission destination and the transmission source are included in the header section of the connection request or any one of the various requests. The server 10 can uniquely acquire the connection information 11a that is the processing target based on such information (e.g., the transmission source ID included in the connection request or the any one of the various requests).

As above, when a connection request is received first from the client 130, the request processing unit 13 generates the connection information 11a relating to the client 130 and maintains the connection information 11a in the holding unit 11. The request processing unit 13 records the acquired (calculated) scheduled release time 11b in the connection information 11a and notifies the client 130 of the scheduled release time 11b. Here, "the first reception of the connection request from the client 130" includes a case where a connection request is received from a client 130 of which corresponding connection information 11a is not maintained by the server 10 such as a client 130 which has been released but for which the release restoring process is not performed.

Every time when any one of various requests are received from the client 130, the request processing unit 13 records the acquired (updated) scheduled release time 11b in the connection information 11a and notifies the client 130 of the scheduled release time.

Furthermore, when being instructed to transmit an error by the reception processing unit 12, the request processing unit 13 transmits an error to the client 130 that is the transmission source of the connection request or the any one of the various requests. As a reason for the transmission of an error, as described above, there is a case where, in a state in which the connection information 11a relating to a client 130 is held in the holding unit 11, a connection request is received from the client 130 or the like. As another reason for the transmission of an error, there is a case where any one of the various requests other than the connection request is received from the client 130 of which the connection information 11a is not held in the holding unit 11 or the like.

The release processing unit (connection releasing unit) 14 performs the client releasing process (connection releasing process) of releasing (releasing the connection established with the client 130) the client 130 for which the current time passes the scheduled release time 11b.

More specifically, the release processing unit 14 determines whether or not the current time has passed the scheduled release time 11b by sequentially referring to one or more pieces of the connection information 11a held in the holding unit 11 for every predetermined time (e.g., 25 seconds). Then, in a case where the current time is determined to have passed the scheduled release time 11b, the release processing unit 14 invalidates the corresponding connection information 11a and cuts off the connection with the client 130.

For example, the request processing unit 13 may invalidate the connection information 11a by removing the connection information 11a such as the connection management information, the resource exclusive information, and the like relating to the client 130 from the holding unit 11.

Even in a case where a predetermined signal is received from the reception processing unit 12, the release processing unit 14 performs the client releasing process for one or more pieces of connection information 11a held in the holding unit 11.

In other words, the release processing unit 14 performs the client releasing process at earlier timing out of timing when a predetermined time elapses after the previous client releasing process and timing when a predetermined signal is received as the predetermined timing.

In addition, one or more pieces of the connection information 11a held in the holding unit 11, for example, is managed using a bidirectional list, and the release processing unit 14 can select the connection information 11a that is the determination target by sequentially tracing the bidirectional list in the client releasing process.

As described above, the release processing unit 14 monitors the connection information 11a of the client 130 on a regular basis and, in a case where there is the connection information 11a of the client 130 that has passed the scheduled release time 11b, releases the client 130.

Conventionally, when a connection between the client and the server is established once, it is expected that the connection information of the client is maintained in the server until the client explicitly gives an instruction of the cut-off of the connection. However, according to the above-described release processing unit 14, the connection information 11a of the client 130 that has passed the scheduled release time 11b can be actively discarded, and accordingly, the amount of the use of the memory 10b of the server 10 and the like can be reduced. In addition, the amount of the connection information of the clients 130 on the server 10 is reduced, and accordingly, the speed of searching for the connection information 11a can be improved.

The request processing unit 13, for example, may configure the scheduled release time 11b (differential interval) to be set to be the same level as the transmission interval of ping requests of the example illustrated in FIG. 20. Accordingly, the distributed file system 1 can reliably exclude the possibility of returning a significant error to the user application with the same level as that of the ping system.

Furthermore, in the above-described server 10, the functions of the reception processing unit 12 and the request processing unit 13 may be configured to be included in a thread that executes a request handler. In addition, the function of the release processing unit 14 may be configured to be included in a thread (client releasing thread) that detects and executes the release of the client 130.

The server 10 can execute a plurality (e.g., the number of the clients 130) of threads that execute the request handler and can execute one client releasing thread. For example, the client releasing thread is operated every time when a predetermined signal is input from each thread executing the request handler so as to execute the client releasing process.

The reception processing unit 12 and the request processing unit 13, for example, are realized by the cooperation of the network interface unit 10d and the CPU 10a executing the control program expanded in the memory 10b. Furthermore, the release processing unit 14, for example, is realized by the CPU 10a that executes the control program expanded in the memory 10b.

[1-5-2] Configuration of Client

Figure 7:
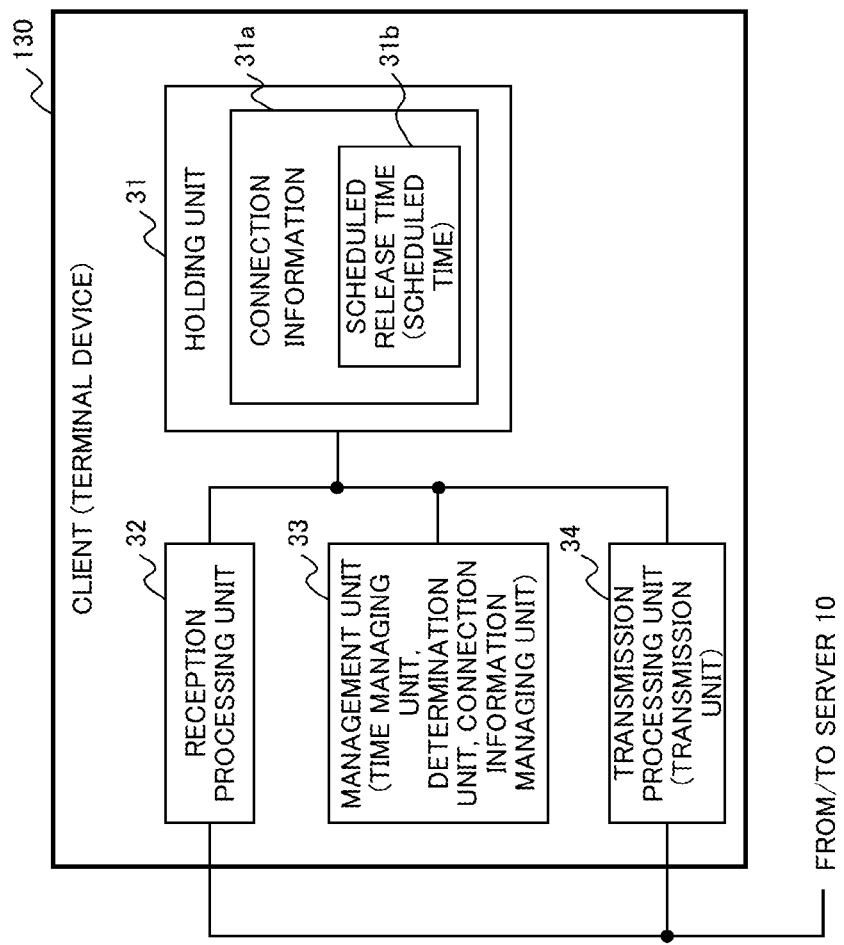
FIG. 7 is a diagram that illustrates an example of the functional configuration of the client illustrated in FIG. 2.

Next, the configuration of the client 130 according to the embodiment as an example will be described with reference to FIG. 7. FIG. 7 is a diagram that illustrates an example of the functional configuration of the client 130 illustrated in FIG. 2.

As described above, the clients 130 having the same number as the servers 10 are included inside each FS client 30, and each of the clients 130 performs one-to-one communication with the corresponding server 10 using the connection established with the server 10.

The client 130 according to the embodiment includes a holding unit 31, a reception processing unit 32, a time management unit 33, and a transmission processing unit 34.

The holding unit 31 holds the connection information 31a relating to the server 10 corresponding to the client 130 including the holding unit 31 and, for example, is realized by the memory 30b, the storage unit 30c, or the like.

In a case where the client 130 including the holding unit 31 is not the client that has been released, the connection information 31a corresponds to the connection information 11a relating to the above-described client 130 that is maintained by the server 10 that is the connection opponent and can include the same information as that of the connection information 11a.

Furthermore, the connection information 31a includes the scheduled release time (scheduled time) 31b notified from the server 10. Here, while the scheduled release time 31b is the same as the scheduled release time 11b that is managed by the corresponding server 10, for the convenience of description, the scheduled release time maintained by the client 130 will be referred to as scheduled release time 31b.

For example, as illustrated in FIG. 5, clients A to C respectively hold connection information 31a-1 to 31a-3 of server A in holding units 31-1 to 31-3. In the connection information 31a-1 to 31a-3, scheduled release times 31b-1 to 31b-3 of that are notified from the server 10 to clients A to C are included. Here, the scheduled release times 31b-1 to 31b-3 are respectively the same as scheduled release times 11b-1 to 11b-3 held in the holding unit 11 by the server 10.

The reception processing unit 32 receives information such as a request (e.g., a distributed lock request) transmitted from the server 10, a reply to a request, and an error.

When a reply is received from the server 10 that has transmitted the connection request or any one of the various requests, the reception processing unit 32 acquires the scheduled release time 31b included in the reply and transfers the scheduled release time 31b to the management unit 33.

The management unit 33 manages the connection information 31a and the scheduled release time 31b and compares the current time with the scheduled release time 31b at the time of transmitting any one of the various requests.

For example, the management unit (time management unit) 33 manages the scheduled release time 31b received by the reception processing unit 32 from the server 10 in association with the connection information 31a relating to the server 10.

When the transmission processing unit 34 transmits any one of the various requests such as a request for read-write to the server 10, the management unit (determination unit) 33 determines whether or not the current time has passed the scheduled release time 31b that is notified from the server 10 and is managed by the management unit 33.

When the current time is determined to have passed the scheduled release time 31b, the management unit (connection information management unit) 33 invalidates (e.g., removes from the holding unit 31) the connection information 31a relating to the server 10. Then, the management unit 33 causes the transmission processing unit 34 to transmit a connection request to the server 10, thereby establishing a connection with the server 10. In other words, when the reception processing unit 32 receives a reply to the connection request from the server 10, the management unit 33 generates the connection information 31a based on the content of the reply and causes the holding unit 31 to hold the generated connection information 31a. Then, the management unit 33 causes the transmission processing unit 34 to transmit any one of the various requests to the server 10 based on the generated connection information 31a.

When the current time is determined not to have passed the scheduled release time 31b, the management unit 33 causes the transmission processing unit 34 to transmit any one of the various requests to the server 10 based on the connection information 31a that is already held in the holding unit 31.

As above, when the client 130 including the management unit 33 is determined to have been released on the server 10 side, the management unit 33 causes the transmission processing unit 34 to transmit a connection request to the server 10 before causing the transmission processing unit 34 to transmit various requests to the server 10.

The transmission processing unit (transmission unit) 34 transmits information of the connection request, the various requests, and the like generated by the user application on the client 130 or the system to the server 10 in accordance with an instruction from the management unit 33. For example, as illustrated in FIG. 6, the transmission processing unit 34 generates and transmits a connection request/various requests including the ID of the server 10 as the transmission destination ID and the ID of the client 130 as the transmission source ID, other connection information 31a, and the like.

In the client 130, the issuance sources of the connection request and the various requests vary from the user application to a system thread. For example, the connection request is issued by a system or the like of the client 130, and the various requests are a system call (syscall) according to the user application executed on the client 130 and the like.

As above, the client 130, every time when transmitting the request, refers to the scheduled release time 31b notified from the server 10 and, in a case where the current time has passed the scheduled release time 31b, does not use the connection information 31a until now but transmits a request after the completion of a reconnection process.

In the example illustrated in FIG. 20, since the number of transmission destinations of ping requests from the client increases in proportion to the number of servers configuring the system, as the number of the servers increases, the CPU load for performing a ping request transmitting process for each client increases. In contrast to this, according to the client 130, a ping request does not need to be transmitted from the client 130 side for detecting the release on the server 10 side, and accordingly, unlike the ping system, an increase in the CPU load of the client that is proportional to the number of servers can be suppressed.

In the example illustrated in FIG. 20, the server that has received a ping replies to the ping request for the client that is the transmission source. Since the amount of the ping request replied by the server increases in proportion to an increase in the number of clients, as the number of clients increases, the CPU load for performing the ping request replying process increases in each server. In contrast to this, according to the client 130, the server 10 side does not need to reply to the ping requests received from the clients 130, and accordingly, unlike the ping system, an increase in the CPU load of the server that is proportional to the number of clients can be suppressed.

Furthermore, in the ping system of the example illustrated in FIG. 20, network resources are used for the transmission of ping requests and the replies thereto. As described above, the load of the network according to the ping requests is calculated as "ping load×number of clients×number of servers". Accordingly, when the scale of the system increases, the network load according to the ping request increases and thus the network bandwidth is pressed. In contrast to this, according to the client 130, the ping request is not transmitted in the release restoring process of the client 130, and accordingly, unlike the ping system, an increase in the network load of the system that is proportional to the system scale (the number of servers and clients) can be suppressed.

In addition, the reception processing unit 32 and the transmission processing unit 34, for example, are realized by the cooperation of the network interface unit 30*d* and the CPU 30*a* that executes the control program expanded in the memory 30*b*. Furthermore, the management unit 33, for example, is realized by the CPU 30*a* that executes the control program expanded in the memory 30*b*.

[1-5-3] Communication Between Server and Client

Figure 8:
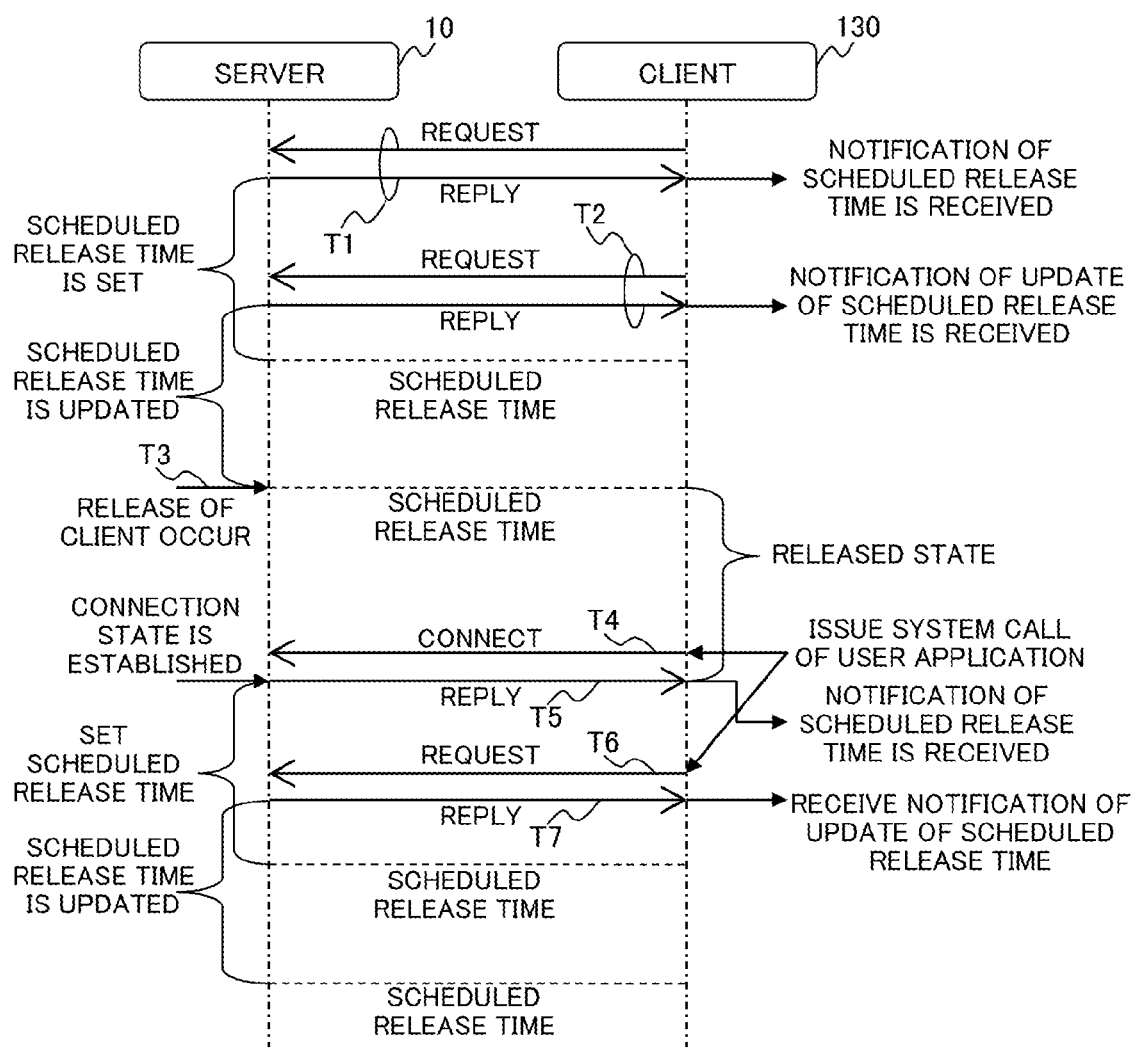
FIG. 8 is a sequence diagram that illustrates an example of the communication between the server and the client illustrated in FIG. 2.

Next, the communication between the server 10 and the client 130 illustrated in FIG. 1 will be described with reference to FIG. 8. FIG. 8 is a sequence diagram that illustrates an example of the communication between the server 10 and the client 130 illustrated in FIG. 2.

As illustrated in FIG. 8, the server 10 (the request processing unit 13) calculates (or updates) the scheduled release time 11*b* from the time at which the last request is received from each client 130 and notifies the client 130 of the scheduled release time 11*b* (31*b*) in Processes T1 and T2. At this time, as the scheduled release time 11*b*, the server 10, for example, calculates time after 25 seconds from the reception time or the reply time (in the example illustrated in FIG. 8, the reply time) and records the scheduled release time 11*b* in the holding unit 11.

In addition, the client 130 records the scheduled release time 31*b* notified from the server 10 in the holding unit 31. When any one of various requests other than the connection request is to be transmitted, the client 130 (the transmission processing unit 34) checks the scheduled release time 31*b* and transmits the request in a case where the current time has not passed the scheduled release time 31*b*.

Here, when it is the scheduled release time 11*b*, the server 10 (the release processing unit 14) releases the client 130 from the server 10 in Process T3.

When the current time has passed the scheduled release time 31*b* at the time of transmitting a system call according to any one of the various requests, for example, a user application, the client 130 (the transmission processing unit 34) transmits a connection request before transmitting the request in Process T4. The server 10 establishes a connection state by performing a reconnection process in accordance with the connection request and includes newly calculated scheduled release time 31*b* in the reply so as to be transmitted to the client 130 in Process T5.

After the reconnection is established, the client 130 transmits a request (system call) to the server 10 in Process T6. The server 10 (the request processing unit 13) performs a process for the request from the client 130 and returns a reply in Process T7.

As above, the server 10 determines whether to release (invalidate) the connection information 31*a* of the client 130 based on the scheduled release time 11*b* acquired when the request from the client 130 is received. In addition, the client 130 determines whether to transmit a connection request before the transmission of an ordinary request (any one of the various requests) based on the scheduled release time 31*b* notified from the server 10.

However, as described above, since the client releasing process on the server side and the release restoring process on the client side are completely asynchronously performed, there are many cases where the released client is present over a long period.

There are cases where a request is issued to a released client from a started user application in a state in which the released client does not recognize to have been released on the server side. While the released client transmits a request to the server when the issued request accompanies an access to the server, the server returns a significant error to the request from the released client. As above, there are many cases where a request from a user application triggers the released client for restoring the release described above, and an error is returned to the user application.

As above, the client releasing process has a function for excluding the possibility of the entire system falling into a hanging state while excluding the possibility of destruction of data in the system and destruction of the system. In other words, since the client releasing process is performed, it is difficult to completely exclude the possibility of returning an error to the user application.

However, even in a case where several minutes to several hours have elapsed after the released state, a situation in which the released client does not perform the release restoring process but an error is returned to the request issued by the user application from the server is not desirable from the viewpoint of the stability of the system.

In contrast to this, in the distributed file system 1 according to the embodiment, the client 130 has the scheduled release time 31*b*. Accordingly, when various requests are transmitted, the client 130 determines whether or not the client 130 itself has been released. In a case where the client 130 has been released, after making a reconnection and acquiring the new connection information 31*a*, the client 130 transmits the request. Accordingly, as described above, the occurrence of the situation in which, as a result of the transmission of various requests from the client 130 with reference to the old connection information 31*a* that is in the released state over a long period, a significant error is returned to the user application can be suppressed.

[1-6] Example of Operation

Next, an example of the operation of the distributed file system 1 according to the embodiment as an example that is configured as described above will be described with reference to FIGS. 9 to 14.

[1-6-1] Example of Operation on Server Side

Figure 9:
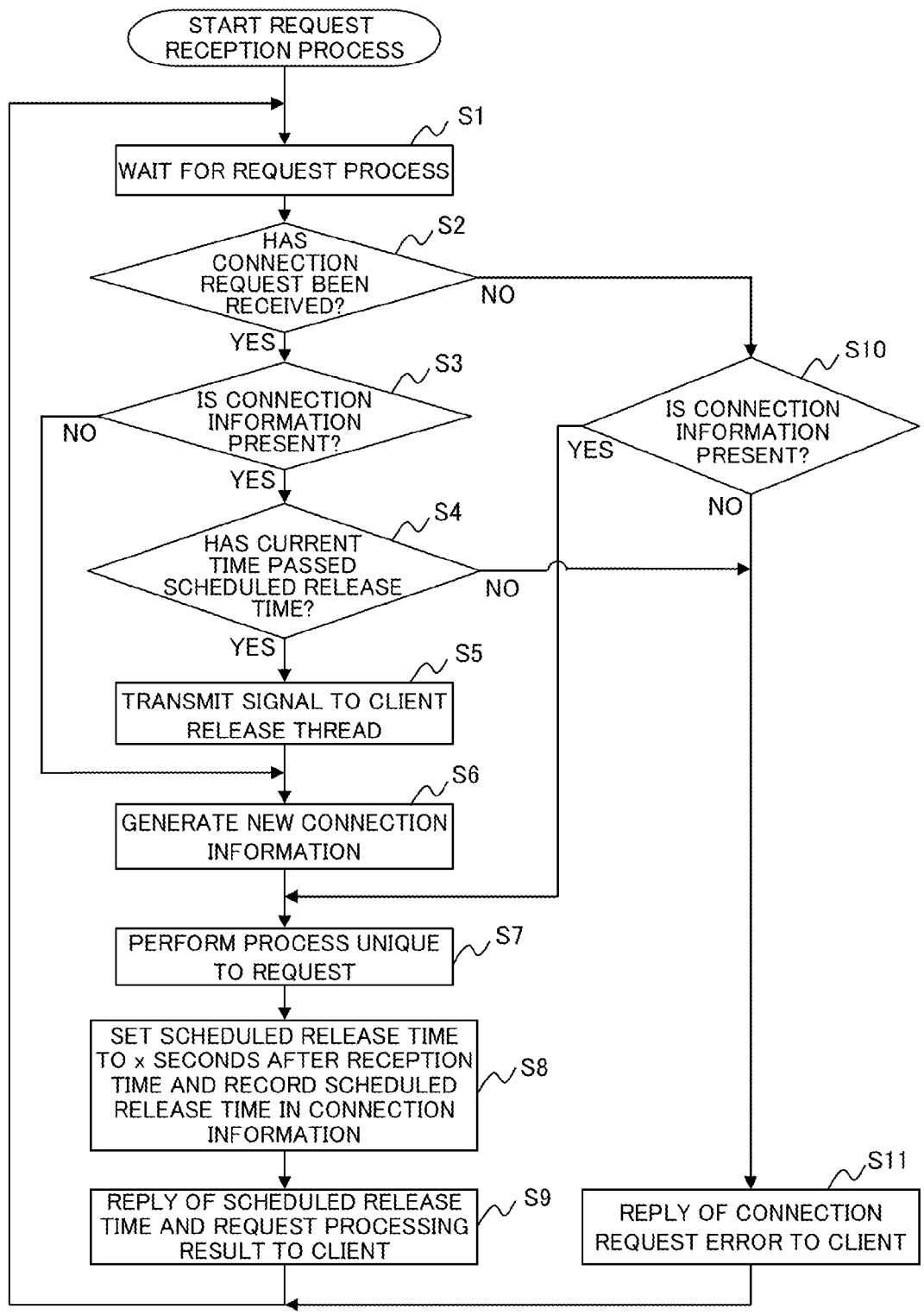
FIG. 9 is a flowchart that illustrates an example of a request reception process performed by the server illustrated in FIG. 2.
Figure 10:
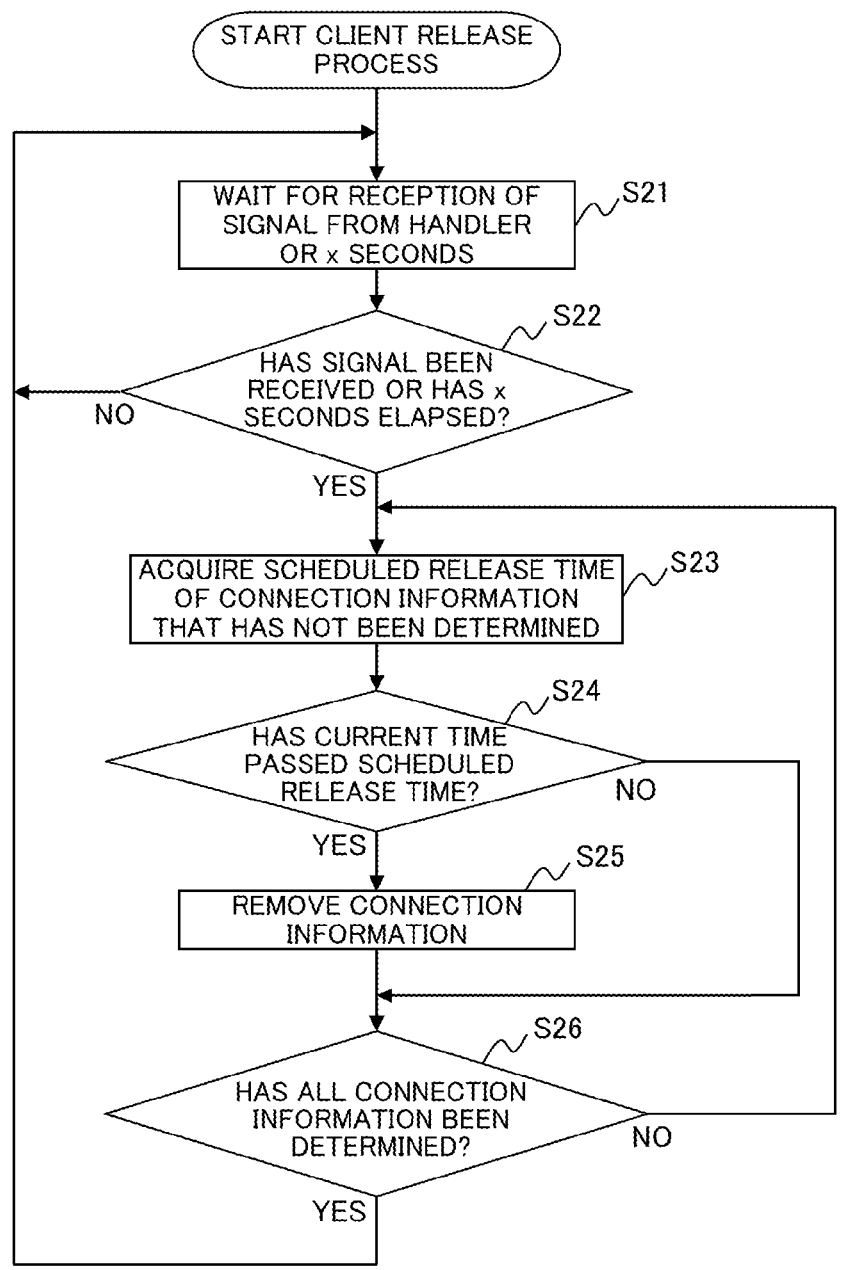
FIG. 10 is a flowchart that illustrates an example of a client releasing process performed by the server illustrated in FIG. 2.

First, an example of the operation of the server 10 will be described. FIGS. 9 and 10 are flowcharts that respectively illustrate examples of a request reception process and a client releasing process performed by the server 10 illustrated in FIG. 2.

[1-6-1-1] Request Reception Process

In the request reception process performed by the server 10, after a request arriving at the server 10 is received by the thread (the reception processing unit 12) executing the request handler, and a process unique to the request is performed, a result of the process is replied to a transmission source client 130.

More specifically, as illustrated in FIG. 9, the server 10 (the reception processing unit 12) waits until the request arrives from the client 130 in Step S1. When the request is received, the content of the received request is checked by the reception processing unit 12, and, for example, it is determined whether or not the request is a connection request in Step S2.

In a case where the request is determined to be a connection request (Yes route of Step S2), connection information 11a on the server 10 is searched by the reception processing unit 12 from the connection information 31a of the client 130 side that is recorded in the request. Then, it is determined whether or not the connection information 11a relating to the transmission source client 130 is present on the server 10 by the reception processing unit 12 in Step S3.

In a case where it is determined that the connection information 11a is present (Yes route of Step S3), a connection with the transmission source client 130 has already been established, and accordingly, it is determined whether or not the current time has passed the scheduled release time 11b by the reception processing unit 12 in Step S4. In other words, even when the connection information 11a is already present, and the client 130 transmits a connection request at the scheduled release time 11b, a situation may be considered in which the timing of the release process performed on the server 10 is delayed, and the connection information 11a of the client 130 remains. As a case where the timing of the release process performed on the server 10 is delayed, there is a case where the processing load is high in the server 10 so as to delay the process, a case where an assumed time or more is taken for the communication, or the like.

Thus, in consideration of such a delayed situation, in a case where a connection request is received in the connection setup state, the server 10 performs the process of Step S4 described above. In a case where the current time is determined to have passed the scheduled release time 11b (Yes route of Step S4), in order to perform the client releasing process using the reception processing unit 12, a signal is transmitted to the client releasing thread (the release processing unit 14) in Step S5.

Subsequently, by the client releasing process, which will be described later, performed by the release processing unit 14, the connection information 11a is newly generated and is recorded in the holding unit 11 in Step S6. Then, by the request processing unit 13, a process unique to any one of the various requests is performed, and a result of the process is set in a reply message (reply) to the request in Step S7.

By the request processing unit 13, the scheduled release time 11b that is acquired by adding x seconds (e.g., 25 seconds) to the current time is generated and is recorded in the connection information 11a in Step S8. Then, by the request processing unit 13, the scheduled release time 11b (31b) is set in the reply message generated in Step S7 so as to be transmitted to the client 130 in Step S9, and the process proceeds to Step S1.

On the other hand, in a case where it is determined that the connection information 11a is not present by the reception processing unit 12 in Step S3 (No route of Step S3), a connection with the transmission source client 130 is not established (or is already released), and accordingly, the process proceeds to Step S6.

In a case where the current time is determined to be before the scheduled release time 11b in Step S4 (No route of Step S4), the process proceeds to Step S11. In other words, in such a case, a situation is formed in which the connection is established, but the connection request is transmitted from the client 130, and accordingly, an error representing that the connection has already been established is replied to the transmission source client 130 by the request processing unit 13. Then, the process proceeds to Step S1.

In Step S2, in a case where the request is determined to be any one of the various requests other than the connection request (No route of Step S2), the connection information 11a on the server 10 is searched by the reception processing unit 12 from the connection information 31a of the client 130 side that is recorded in the request. Then, it is determined whether or not the connection information 11a relating to the transmission source client 130 is present on the server 10 by the reception processing unit 12 in Step S10.

In a case where it is determined that the connection information 11a is not present (No route of Step S10), any one of the various requests is received in the state in which the connection is not established, an error is returned to the client 130 by the request processing unit 13 in Step S11. Then, the process proceeds to Step S1.

On the other hand, in a case where the connection information 11a is determined to be present (Yes route of Step S10), in order to perform the process unique to the request, the process proceeds to Step S7.

In addition, also in such a case, similar to the description presented above in Step S4, there is a possibility that the current time has passed the scheduled release time 11b. However, for any one of the various requests other than the connection request, in the determination step of Step S10, the connection information 11a is referred to. Accordingly, in the client releasing thread to be described later, when the exclusive relation is appropriately set such that the connection information 11a is not removed during the request reception process, the scheduled release time 11b is overwritten to be updated when the request reception process is completed. Accordingly, since the client 130 is not released, the problem as in Step S4 described above does not occur. For example, an appropriate exclusive relation can be set by applying a spin lock or the like such that the process of the same connection information 11a is not performed at the same time between the thread executing the request handler and the client releasing thread.

[1-6-1-2] Client Releasing Process

The client releasing thread (the release processing unit 14) is started to operate at the timing of the reception of a signal or at the interval of x seconds (e.g., 25 seconds), checks the scheduled release time 11b of the connection information 11a, and performs the client releasing process in a case where there is the scheduled release time 11b passing the current time.

More specifically, as illustrated in FIG. 10, the process is caused to wait by the release processing unit 14 until the signal is received or until 25 seconds elapse in Steps S21 and S22 (No route of Step S22). When the signal is received, or when 25 seconds elapse (Yes route of Step S22), the scheduled release time 11b of the connection information 11a, which has not been determined, is acquired by the release processing unit 14 in Step S23, and it is determined whether or not the current time has elapsed the scheduled release time 11b in Step S24.

In a case where the current time is determined to have passed the scheduled release time 11b (Yes route of Step S24), the connection information 11a is removed by the release processing unit 14 in Step S25. Then, it is determined whether or not the determination is made for all the connection information 11a held by the holding unit 11 by the release processing unit 14 in Step S26.

In a case where it is determined that the determination has been made for all the connection information 11a (Yes route of Step S26), the process proceeds to Step S21. On the other hand, in a case where it is determined that the determination has not been made for all the connection information 11a (No route of Step S26), the process proceeds to Step S23.

In Step S24, in a case where the current time is determined not to have passed the scheduled release time 11b (No route of Step S24), the process proceeds to Step S26.

Meanwhile, in the client releasing process, a case may be considered in which the current time passes the scheduled release time 11b right after the checking process of Step S24 is performed for the connection information 11a. However, there is no problem in accordance with (a) and (b) described below.

(a) When a connection request having the connection information 11a as a target arrives, old connection information 11a is not used based on the determination made in Step S3 illustrated in FIG. 9, but new connection information 11a is generated in Step S6 (No route of Step S3). In addition, even when the client releasing thread completes the current loop process in accordance with the signal transmitted in Step S5, the client releasing thread is immediately started and restarts the loop process (Yes route of Step S22 illustrated in FIG. 10), and the old connection information 11a is removed in a speedy manner.

(b) When any one of the various requests other than the connection request having the connection information 11a as a target arrives, in a case where the connection information 11a is present in Step S10 illustrated in FIG. 9, the scheduled release time 11b is updated at a time point of the completion of the request process (No route of Step S10) in Step S7. In other words, the exclusive relation of the connection information 11a between the thread executing the request handler and the client releasing thread may be appropriately set when the determination is made in Step S10.

[1-6-2] Example of Operation of Client 130

Next, an example of the operation performed by the client 130 will be described. FIGS. 11 to 14 are flowcharts that illustrate examples of a connection request transmitting process, a request transmitting process, a reply reception waiting process, and a reply reception process performed by the client 130 illustrated in FIG. 2.

[1-6-2-1] Connection Request Transmitting Process

The client 130 transmits a connection request used for establishing a connection with the server 10 that is the connection target.

Figure 11:
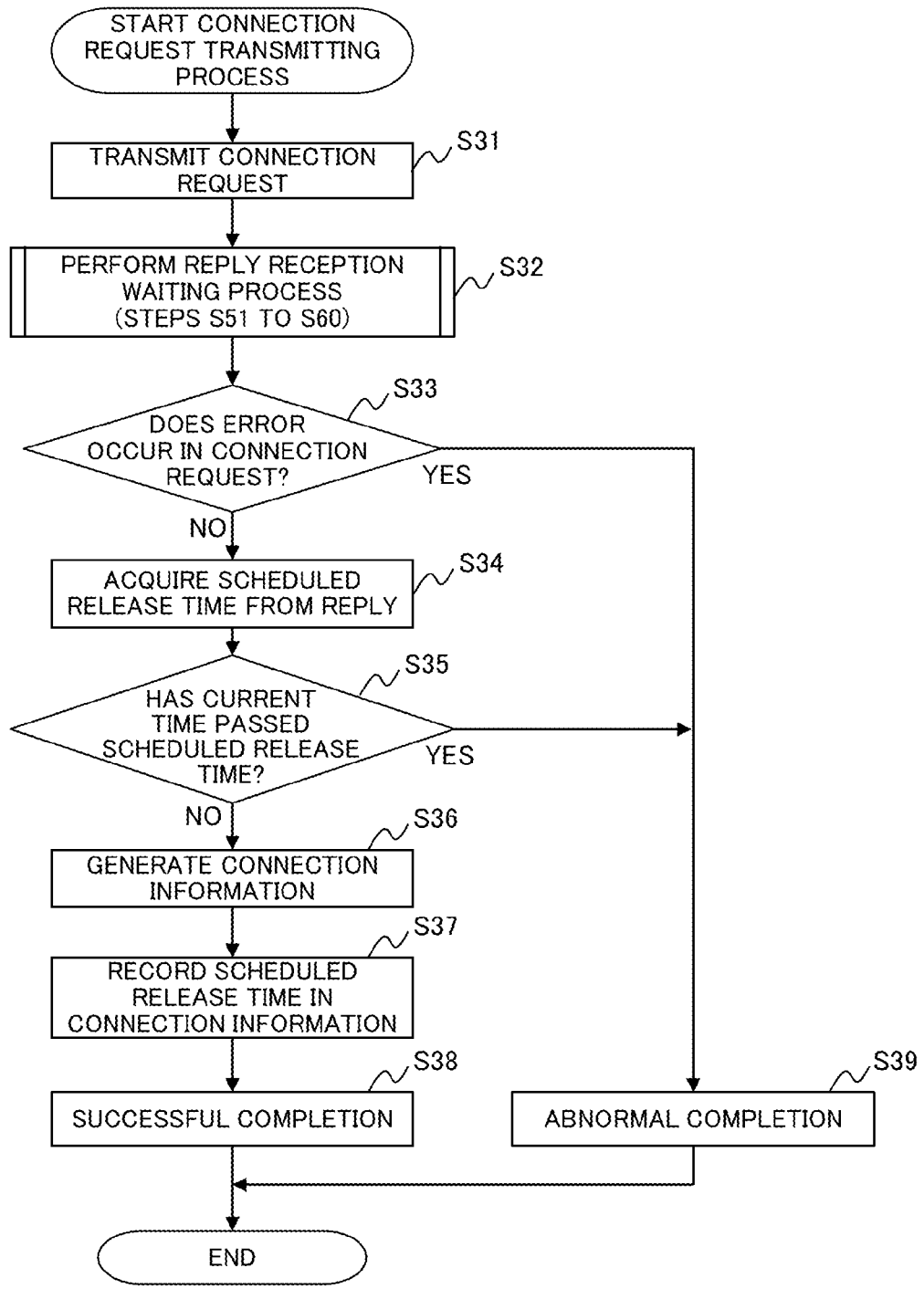
FIG. 11 is a flowchart that illustrates an example of a connection request transmitting process performed by the client illustrated in FIG. 2.
Figure 13:
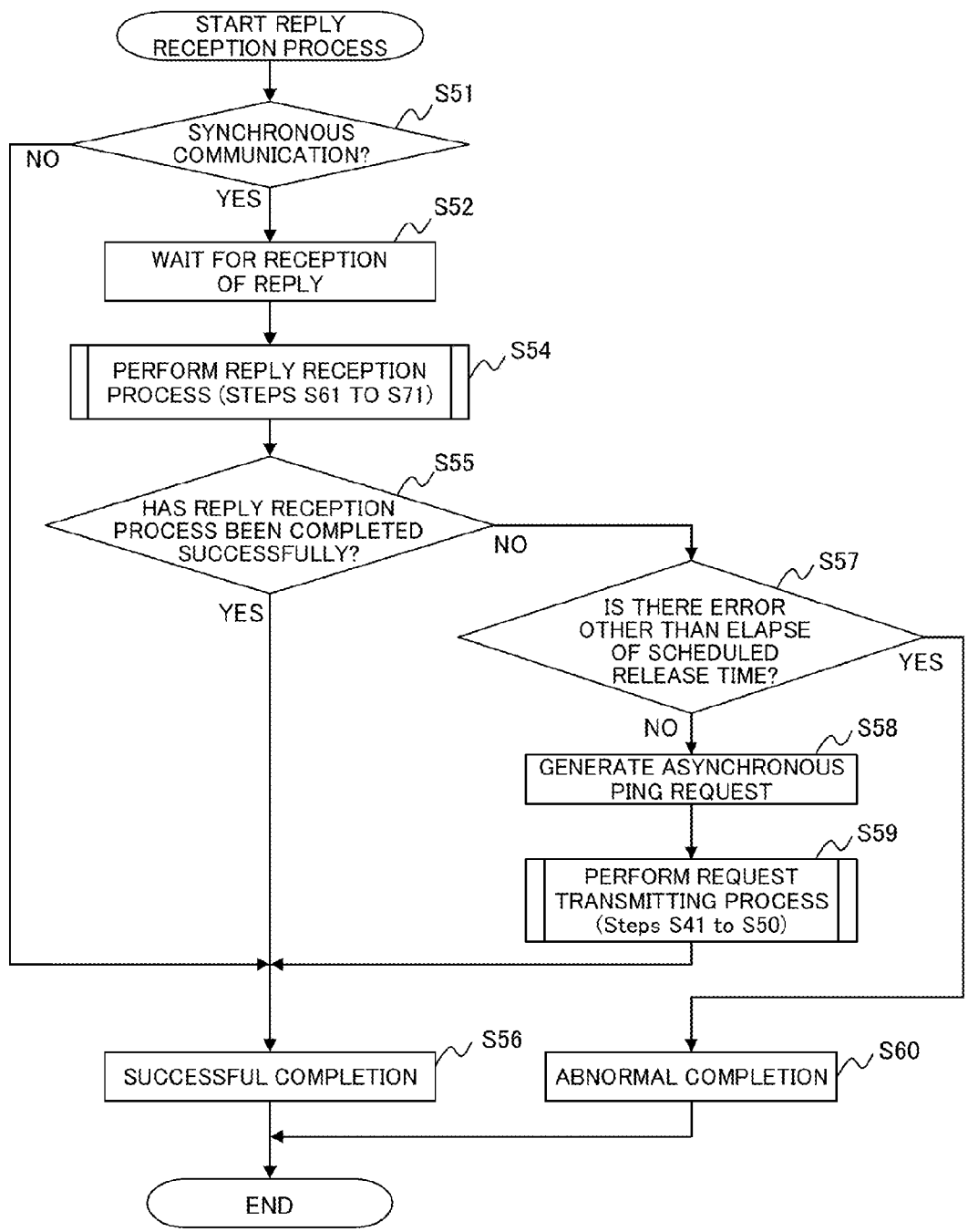
FIG. 13 is a flowchart that illustrates an example of a reply reception waiting process performed by the client illustrated in FIG. 2.

More specifically, as illustrated in FIG. 11, a connection request is transmitted to the server 10 by the transmission processing unit 34 in Step S31, and waiting for the reception of the reply is performed in Step S32 and Steps S51 to S60 illustrated in FIG. 13.

When the reply from the server 10 is received by the reception processing unit 32, the content of the reply is analyzed by the reception processing unit 32, and it is determined whether or not an error occurs in accordance with the connection request in Step S33.

In a case where it is determined that an error does not occur (No route of Step S33), the scheduled release time 31b is acquired from the reply by the management unit 33 in Step S34, and it is determined whether or not the current time has passed the acquired scheduled release time 31b in Step S35.

In a case where the current time is determined not to have passed the scheduled release time 31b (No route of Step S35), it is determined that the connection request is successful by the management unit 33, and the connection information 31a for the server 10 is newly generated in Step S36. By the management unit 33, the acquired scheduled release time 31b is recorded in the generated connection information 31a in Step S37, and the process is normally completed in Step S38.

On the other hand, in Step S33, in a case where it is determined that an error (connection error) occurs in the connection request (Yes route of Step S33), the process is abnormally completed in Step S39. Here, the reason for the abnormal completion of the process through the No route of Step S33 is so as to transfer the determination on whether or not the connection request is retried to the transmission source (e.g., the system of the client 130) of the connection request.

In addition, also in a case where the current time is determined to have passed the scheduled release time 31b in Step S35 (Yes route of Step S35), the process is abnormally completed in Step S39. In a case where the current time has passed the scheduled release time 31b that has just been received, there is a high possibility that there is an abnormality in one of the server 10 side, the client 130 side, and a communication path between the client and the server. Thus, in order to transfer the determination to the request transmission source, also in the process through the Yes route of Step S35, the process is abnormally completed.

[1-6-2-2] Request Transmitting Process

The connection request transmitting process is a process used for setting a connection with the server 10 on the client 130 side and thus is a special request from the viewpoint of the connection management. Hereinafter, on the premise that the connection state is already present, a process for any one of the various requests (hereinafter, simply referred to as a request) other than the connection request that are transmitted from the client 130 will be described.

Figure 12:
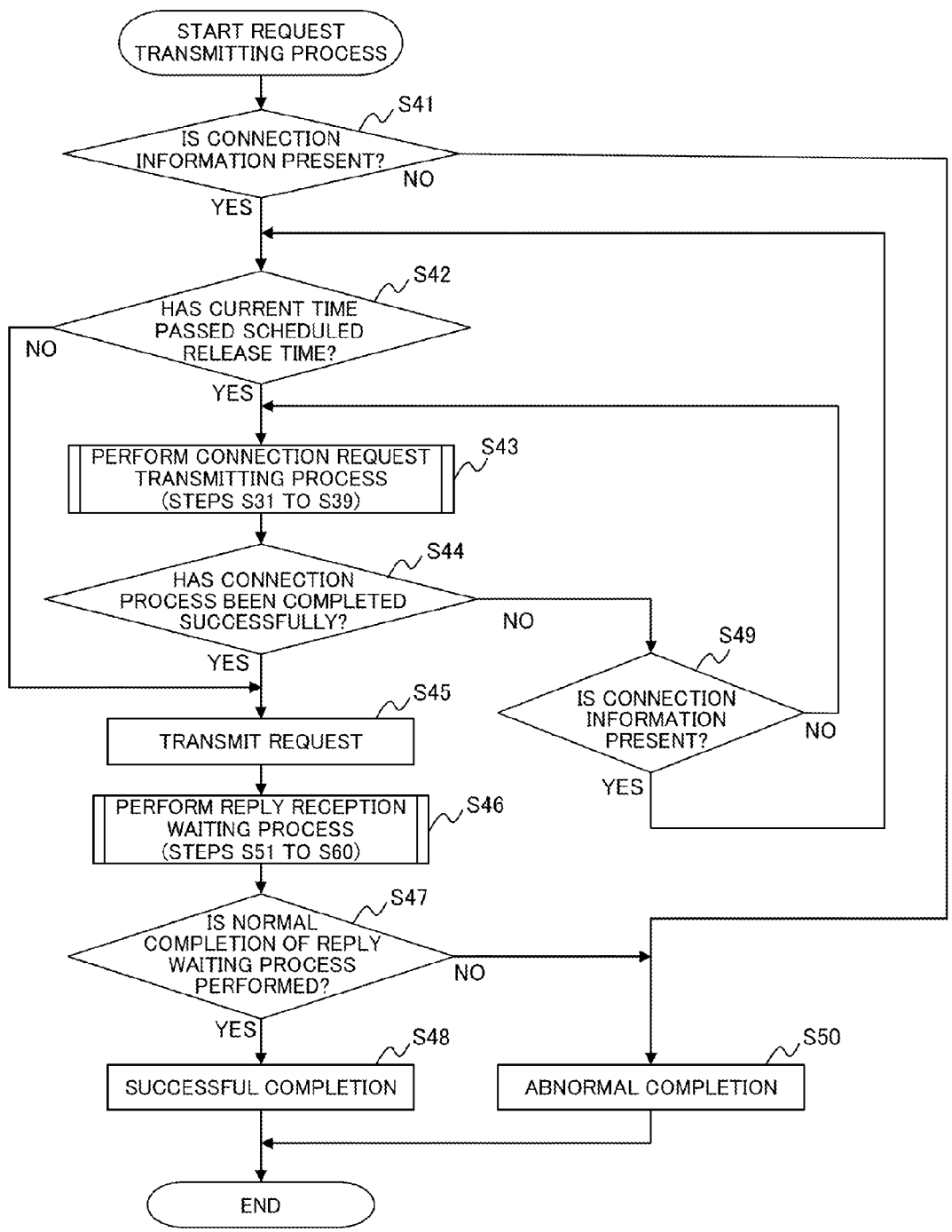
FIG. 12 is a flowchart that illustrates an example of a request transmitting process performed by the client illustrated in FIG. 2.

More specifically, as illustrated in FIG. 12, by the management unit 33, the connection information 31a including the information of the server 10 that is the request transmission destination is searched, and it is determined whether or not the connection information 31a is present in Step S41. Here, the reason for the search of the connection information 31a is that there is a case where the client 130 is unmounted by the operation of a user or anyone else in the state in which the connection is established or another case where the connection is cut off due to an error or the like.

In a case where the connection information 31a is determined not to be present (No route of Step S41), the transmission of the request is a process for the server 10 with which the connection is not established, and accordingly, the process is abnormally completed in Step S50.

On the other hand, in a case where the connection information 31a is determined to be present (Yes route of Step S41), the current time and the scheduled release time 31b recorded in the connection information 31a are compared with each other by the management unit 33, and it is determined whether or not the current time has passed the scheduled release time 31b in Step S42.

In a case where the current time is determined to have passed the scheduled release time 31b (Yes route of Step S42), the transmission processing unit 34 is instructed to perform the connection request transmitting process by the management unit 33 in Step S43 and Steps S31 to S39 illustrated in FIG. 11.

Subsequently, it is determined whether or not the connection process is normally completed by the reception processing unit 32 in Step S44. In a case where the connection process is determined to be abnormally completed (No route of Step S44), it is determined whether or not the connection information 31a is present (generated) by the management unit 33 in Step S49. In a case where the connection information 31a is determined not to be present (No route of Step S49), in order to perform a connection retry, the process proceeds to Step S43. On the other hand, in a case where the connection information 31a is determined to be present (Yes route of Step S49), the process proceeds to Step S42.

In Step S49, although the connection request transmitting process is abnormally completed, the presence/non-presence of the connection information 31a is checked again. This is in consideration of a case where two or more requests are issued from the same client 130 for the same server 10 at the same time, and another request has completed a connection setup in advance.

On the other hand, in Step S44, in a case where the connection process is determined to be normally completed (Yes route of Step S44), a request is transmitted by the transmission processing unit 34 to the server 10 based on the acquired scheduled release time 31b in Step S45. In addition, the reply reception waiting process is performed by the reception processing unit 32 in Step S46 and Steps S51 to S60 illustrated in FIG. 13.

In a case where the current time is determined not to have passed the scheduled release time 31b (No route of Step S42), the process proceeds to Step S45.

Subsequently, it is determined whether or not the reply reception waiting process has been normally completed by the reception processing unit 32 in Step S47. In a case where the reply reception waiting process is determined to have been abnormally completed by the management unit 33 (No route of Step S47), in order to transfer it to be determined by the process of the transmission source whether or not the request is to be retried, the process is abnormally completed in Step S50.

On the other hand, in a case where the reply reception waiting process is determined to have been normally completed by the management unit 33 (Yes route of Step S47), the process is normally completed in Step S48.

[1-6-2-3] Reply Reception Waiting Process

When a connection request or any one of the various requests is transmitted to the server 10, the client 130 performs a process of waiting for the reply to the request from the server 10. However, in a case where the request is an asynchronous request, the client 130 is immediately returned without waiting for the reply to the request.

As illustrated in FIG. 13, when a connection request or any one of the various requests is transmitted by the client 130 to the server 10, it is determined whether or not the transmitted request is transmitted in synchronous communication by the reception processing unit 32 in Step S51. In a case where the transmitted request is determined to be transmitted in non-synchronous communication, in other words, asynchronous communication (No route of Step S51), the process is normally completed immediately in Step S56.

On the other hand, in a case where the transmitted request is determined to be transmitted in synchronous communication (Yes route of Step S51), waiting for the reception of the reply to the request is performed by the reception processing unit 32 in Step S52. When the reply to the request is received, by the reception processing unit 32, the reception reply process is performed in Step S54 and Steps S61 to S71 illustrated in FIG. 14. Then, it is determined whether the reply reception process is normally completed by the reception processing unit 32 in Step S55. In a case where the reply reception process is determined to be normally completed (Yes route of Step S55), the request reply waiting process is normally completed in Step S56.

In a case where the reply reception process is determined to be abnormally completed (No route of Step S55), it is determined by the reception processing unit 32 whether an error returned from the reply reception process is an error other than an error that is generated due to the passing of the current time over the scheduled release time 31b in Step S57.

In a case where the error is determined to be an error other than the error generated due to the passing of the current time over the scheduled release time 31b (Yes route of Step S57), the process is abnormally completed with the same error as that of the reply reception process in Step S60. On the other hand, in a case where the error is determined to be the error generated due to the passing of the current time over the scheduled release time 31b (No route of Step S57), a ping request transmitted in asynchronous communication is generated by the transmission processing unit 34 in Step S58. Then, the ping request is asynchronously transmitted to the server 10 by the transmission processing unit 34 in Step S59 and Steps S41 to S50 illustrated in FIG. 12, and the process is normally completed in Step S56.

The reason for the normal completion of the process through the No route of Step S57 is that all the process is normally completed except that the current time is over the scheduled release time 31b. In other words, the request transmitting/reply process for the server 10 is normally completed, and the original purpose is achieved.

The transmission of the ping request to the server 10 using the transmission processing unit 34 in Steps S58 and S59 is not for returning an error due to the release of a client in a case where the client 130 transmits a request to the server 10 next time. In other words, in Steps S58 and S59, the client 130 transmits a certain request (in this case, a ping request issued by the system) to the server 10, and the release restoring process is performed.

[1-6-2-4] Reply Reception Process

The request reply reception process, in the case of synchronous communication, is started by the transmission source of the request in the client 130. The request reply reception process, in the case of asynchronous communication, for example, is started by calling a callback function or the like from a thread other than the request transmission source that manages the transmission/reception of the request. For example, when a reply to the request is received from the server 10, the client 130 performs a reply reception process that is unique to the request.

Figure 14:
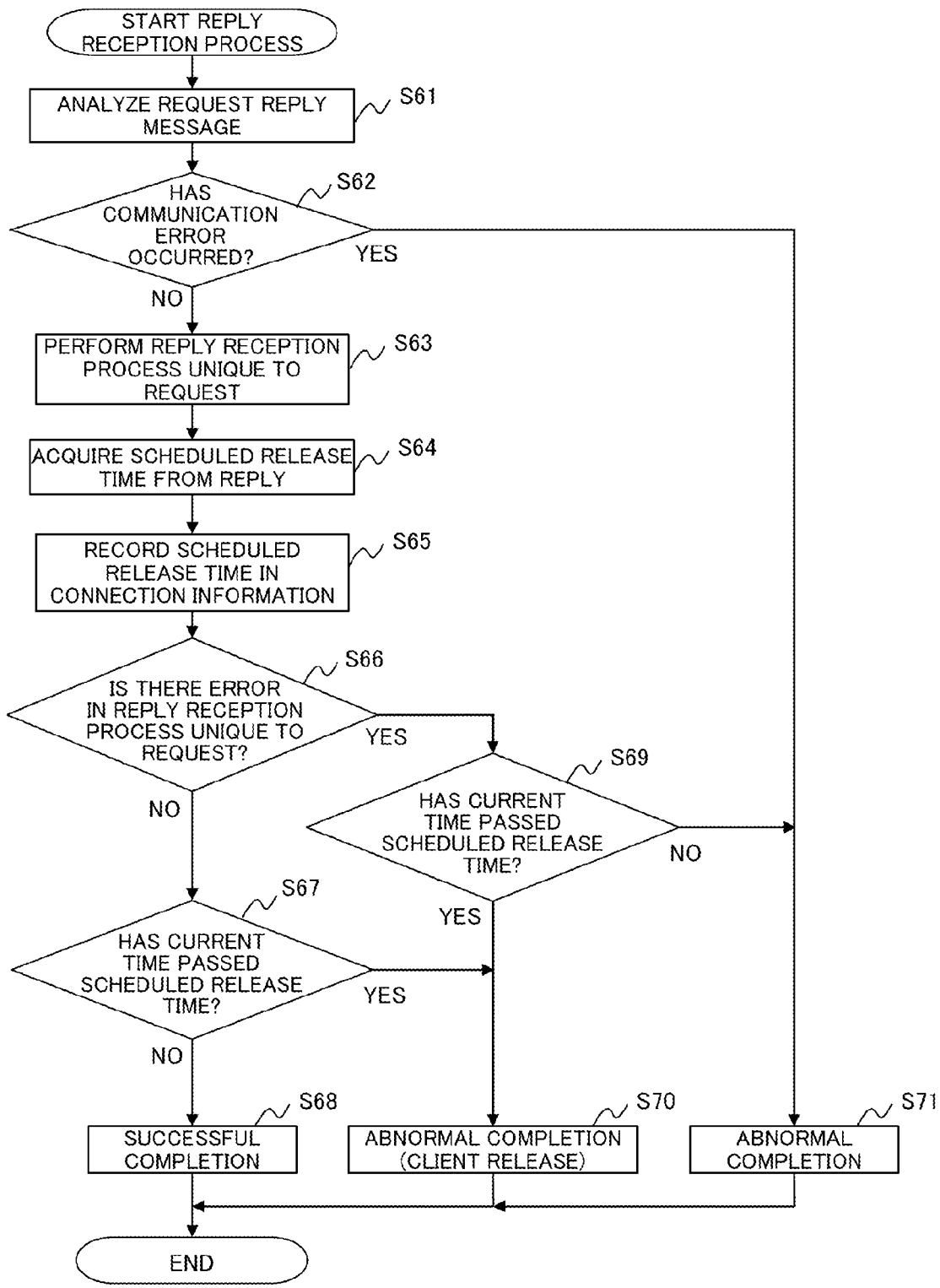
FIG. 14 is a flowchart that illustrates an example of a reply reception process performed by the client illustrated in FIG. 2.

More specifically, as illustrated in FIG. 14, the content of the received request reply message is analyzed by the reception processing unit 32 in Step S61, and it is determined whether or not a communication error occurs in Step S62.

In a case where the communication error is determined to occur by the reception processing unit (Yes route of Step S62), the scheduled release time 31b is not updated, and the process is abnormally completed immediately in Step S71. The case proceeding to the Yes route of Step S62 also includes a case where a request does not arrive at the server 10.

On the other hand, in a case where the communication error is determined not to occur (No route of Step S62), the reply reception process that is unique to each request is performed by the reception processing unit 32 in Step S63. Then, by the management unit 33, the scheduled release time 31b included in the reply message is acquired in Step S64, and the acquired scheduled release time 31b is overwritten into the connection information 31a so as to be stored in Step S65.

In addition, by the reception processing unit 32, it is determined whether or not the reply reception process that is unique to the request is completed with an error in Step S66. In a case where normal completion is determined (No route of Step S66), the management unit 33 determines whether or not the current time has passed the new scheduled release time 31b in Step S67. In a case where it is determined that the current time has not passed the new scheduled release time 31b (No route of Step S67), the process is normally completed in Step S68. In a case where it is determined that the current time has passed the new scheduled release time 31b (Yes route of Step S67), the client 130 has been released on the server 10 side, and accordingly, the process is abnormally completed in Step S70.

On the other hand, in a case where abnormal completion is determined in Step S66 (Yes route of Step S66), the management unit 33 determines whether or not the current time has passed the new scheduled release time 31b in Step S69. In a case where the current time is determined not to have passed the new scheduled release time 31b (No route of Step S69), the process is abnormally completed in Step S71. In a case where the current time is determined to have passed the new scheduled release time 31b (Yes route of Step S69), the client 130 has been released on the server 10 side, and accordingly, the process is abnormally completed in Step S70.

[2] Others

While the preferred embodiment of the present invention has been described in detail, the present invention is not limited to the embodiment described above, but various changes and modifications can be made therein in a range not departing from the concept of the present invention.

Figure 15:
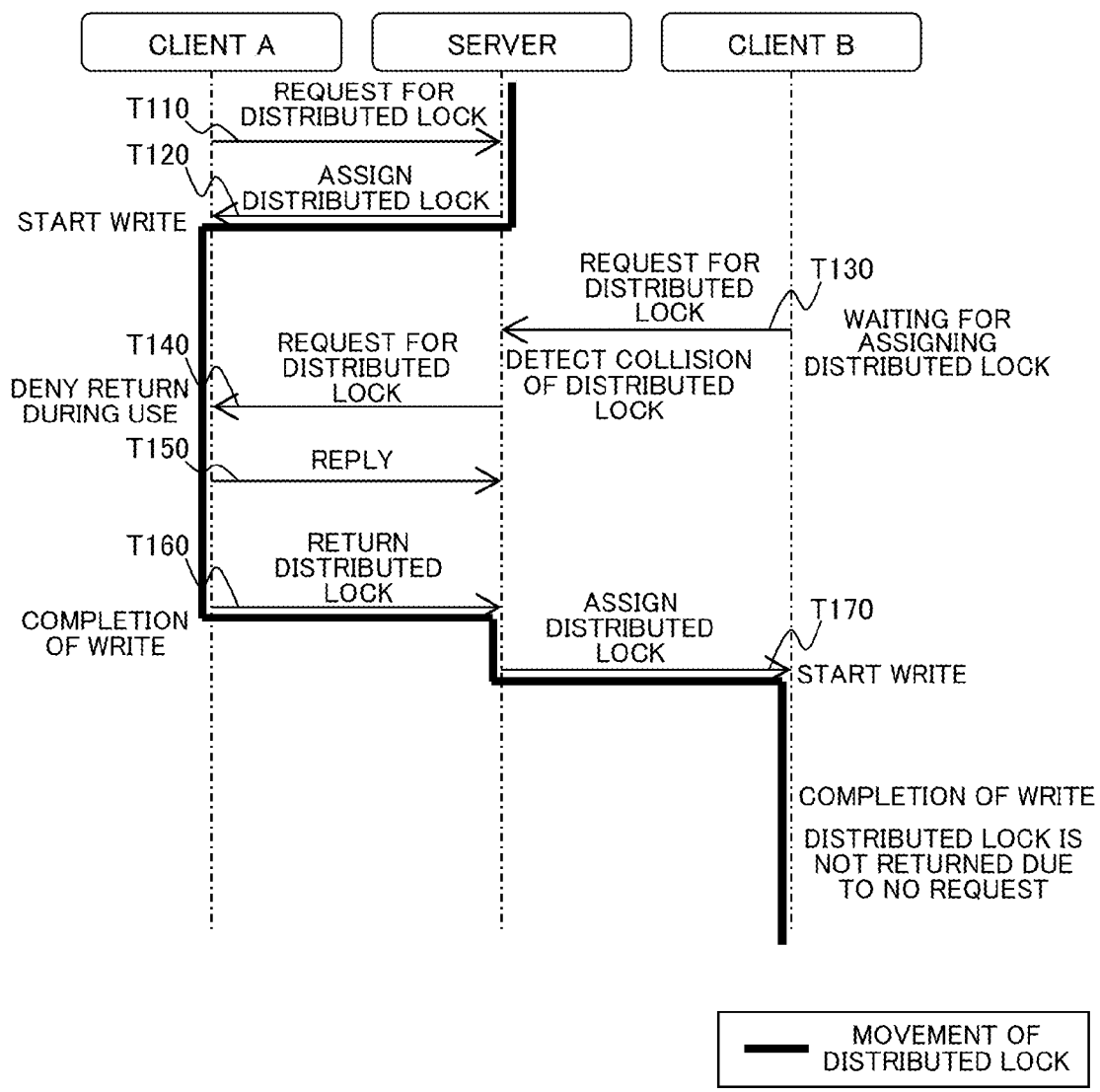
FIG. 15 is a diagram that illustrates an example of a distributed lock operation.
Figure 16:
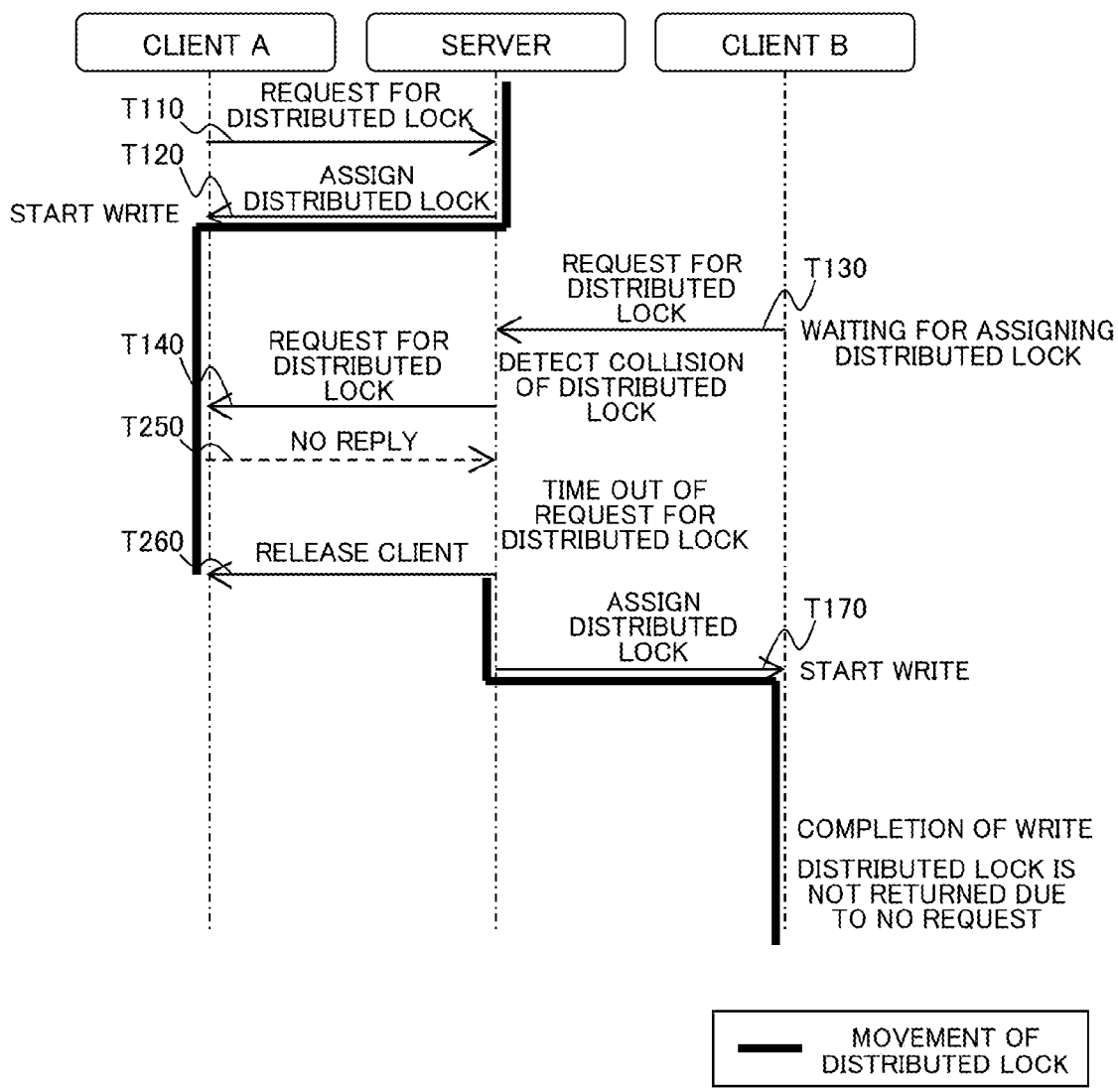
FIG. 16 is a diagram that illustrates the distributed lock operation performed when a client is released.
Figure 17:
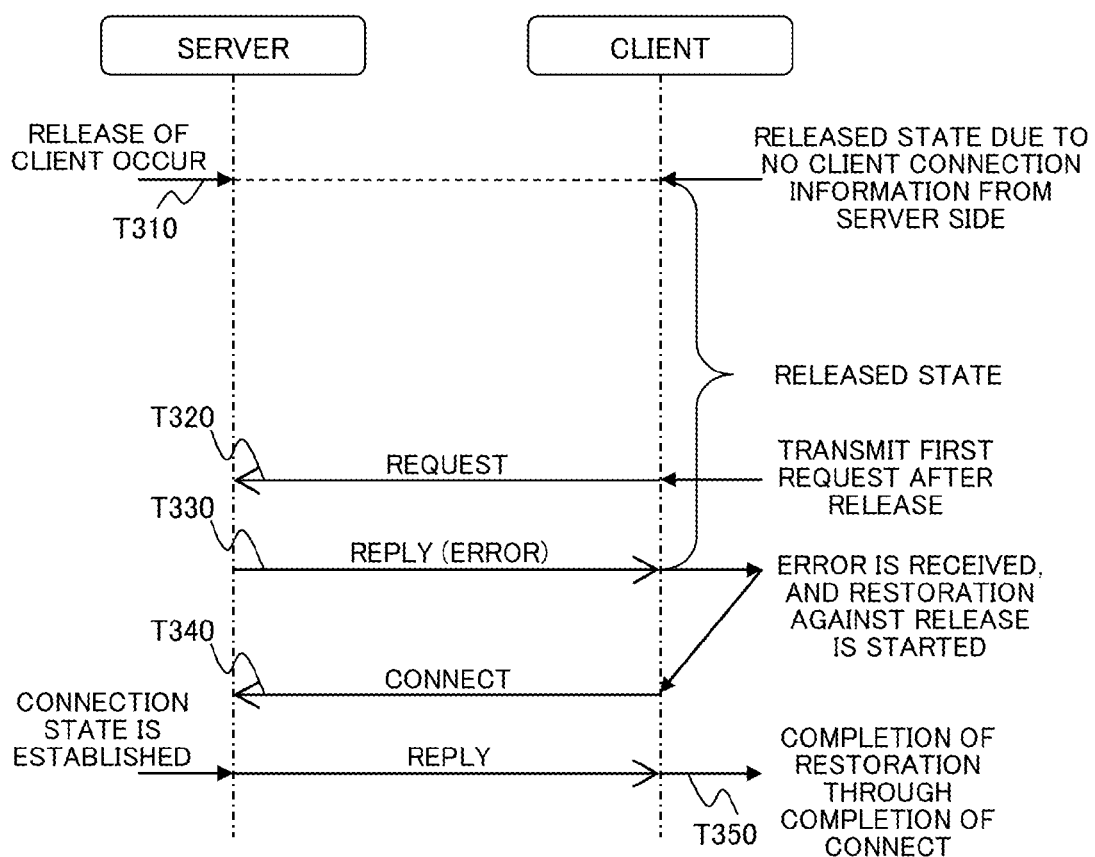
FIG. 17 is a diagram that illustrates an example of a client releasing process and a release restoring process.
Figure 18:
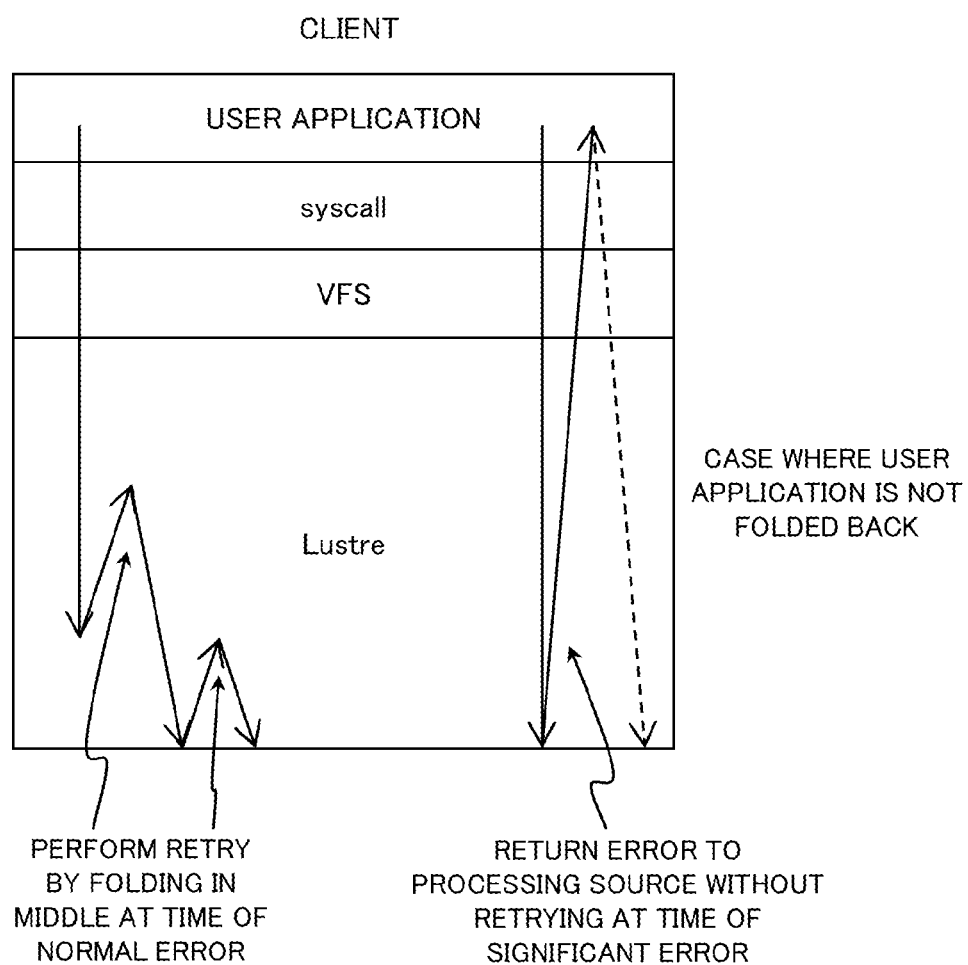
FIG. 18 is a diagram that illustrates an example of a rewrite process at the time of the occurrence of an error in the client.
Figure 19:
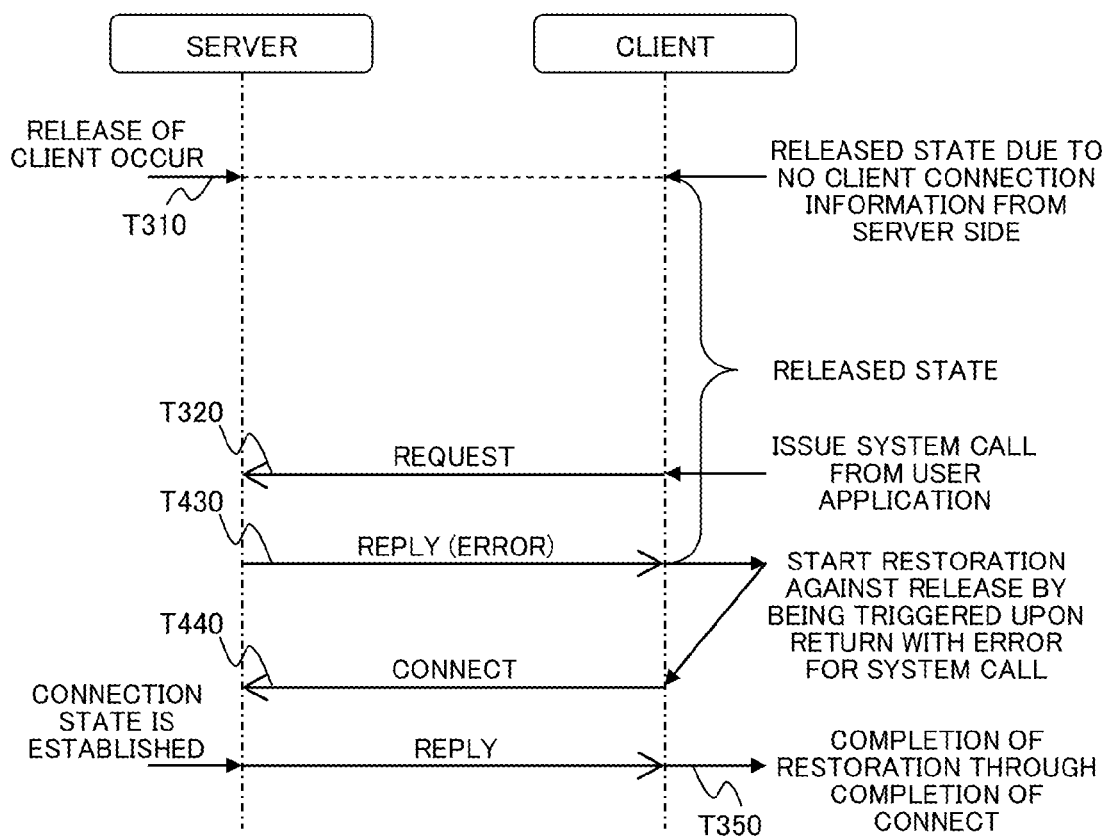
FIG. 19 is a diagram that illustrates an example of the influence of the release of a client on an application.

For example, in the description presented above, while the operation of the distributed file system 1 has been described in a case where one client 130 communicates with the server 10, as illustrated in FIG. 2, the operation may be similarly performed also in a case where a plurality of clients 130 communicate with the server 10. In such a case, similar to the example illustrated in FIG. 15, when a distributed lock is assigned from the server in Process T110, client A can update the scheduled release time 31b by transmitting requests to the server on a regular basis (e.g., at an interval that is shorter than 25 seconds). While client B issues a distributed lock request to the server in Process T120, a reply is not returned to the server, and accordingly, the calculation of the scheduled release time 31b of the client B is not performed in the server up to Process T160.

While the server 10 and the client 130 have been described to maintain the same scheduled release times 11b and 31b, the present invention is not limited thereto. For example, the server 10 may notify the client 130 of the scheduled release time 31b representing time that is earlier than the scheduled release time 11b maintained by the server 10 in consideration of a delay of the network between the client 130 and the server 10, a processing delay between the client 130 and the server 10, and the like.

All or some of the various functions of the server 10 and the client 130 according to the embodiment may be realized by executing a predetermined program using a computer (including a CPU, an information processing apparatus, and various terminals).

The program is provided in a form being recorded in a computer-readable recording medium (e.g., the recording medium 10h illustrated in FIG. 3) such as a flexible disk, a CD, a DVD, or a Blue-ray disc. Examples of the CD include a CD-ROM, a CD-R, and a CD-RW. Examples of the DVD include a DVD-ROM, a DVD-RAM, a DVD-R, a DVD-RW, a DVD+R, and a DVD+RW. In such a case, the computer reads the program from the recording medium and transmits the program to an internal storage device or an external storage device so as to be stored therein and used.

According to the embodiment, a connection between the information processing apparatus and the terminal device can be setup again by reducing the frequency of returning an error to an application and suppressing an increase in the load of the information processing system.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:
1. An information processing system comprising:
an information processing apparatus; and
a terminal device configured to communicate with the information processing apparatus using a connection established between the information processing apparatus and the terminal device,
wherein the information processing apparatus includes a first processor,
wherein the first processor notifies the terminal device of scheduled time of release of the connection,
wherein the terminal device includes a second processor, and
wherein the second processor
determines whether or not current time has passed the scheduled time notified from the information processing apparatus at the time of transmitting a request to the information processing apparatus, and
in a case where the current time is determined to have passed the scheduled time, before transmitting the request to the information processing apparatus, transmits a connection request for establishing a connection with the information processing apparatus to the information processing apparatus,
wherein the first processor of the information processing apparatus determines whether or not the current time has passed the scheduled time for every predetermined time and, in a case where the current time is determined to have passed the scheduled time, releases the connection established between the information processing apparatus and the terminal device,
wherein the connection includes an exclusive lock of a shared resource of the information processing apparatus, the exclusive lock of the shared resource being requested from the terminal device, and
wherein the releasing of the connection includes a releasing of the exclusive lock of the shared resource requested from the terminal device.
2. The information processing system according to claim 1, wherein the first processor of the information processing apparatus
manages the scheduled time in association with connection information relating to the terminal device, and
in a case where the current time is determined to have passed the scheduled time managed by the first processor, invalidates the connection information.
3. The information processing system according to claim 2, wherein the first processor of the information processing apparatus, upon receipt of the connection request or a request other than the connection request from the terminal device, acquires scheduled time by adding a predetermined time to the current time and manages the acquired scheduled time in association with the connection information relating to the terminal device.

4. The information processing system according to claim 1, wherein the first processor of the information processing apparatus, upon receipt of the connection request or a request other than the connection request from the terminal device, includes the scheduled time in a reply to the connection request or the request and notifies the terminal device of the reply.

5. The information processing system according to claim 1, wherein the second processor of the terminal device
manages the scheduled time received from the information processing apparatus in association with connection information relating to the information processing apparatus, and
in a case where the current time is determined to have passed the scheduled time, invalidates the connection information.

6. The information processing system according to claim 5,
wherein the second processor of the terminal device,
at the time of transmitting the request to the information processing apparatus, determines whether the current time has passed the scheduled time that is managed by the second processor, and
transmits the request to the information processing apparatus based on the connection information in a case where the current time is determined not to have passed the scheduled time, and transmits a connection request to the information processing apparatus before transmitting the request to the information processing apparatus without using the connection information invalidated by the second processor in a case where the current time is determined to have passed the scheduled time.

7. An information processing apparatus comprising:
a processor,
wherein the processor,
when a connection request is received from a terminal device, performs a connection process establishing a connection between the terminal device and the information processing apparatus,
notifies the terminal device of scheduled time of release of the connection established by the connection process, and
determines whether the current time has passed the scheduled time for every predetermined time, and releases the connection established between the terminal device and the information processing apparatus in a case where the current time is determined to have passed the scheduled time,
wherein the connection includes an exclusive lock of a shared resource of the information processing apparatus, the exclusive lock of the shared resource being requested from the terminal device, and
wherein the releasing of the connection includes a releasing of the exclusive lock of the shared resource requested from the terminal device.

8. The information processing apparatus according to claim 7, wherein the processor manages the scheduled time in association with connection information relating to the terminal device, and
in a case where the current time is determined to have passed the scheduled time managed by the processor, invalidates the connection information.

9. The information processing apparatus according to claim 7, wherein the processor, upon receipt of the connection request or a request other than the connection request from the terminal device, acquires scheduled time by adding a predetermined time to the current time and manages the acquired scheduled time in association with the connection information relating to the terminal device.

10. The information processing apparatus according to claim 7, wherein the processor, upon receipt of the connection request or a request other than the connection request from the terminal device, includes the scheduled time in a reply to the connection request or the request and notifies the terminal device of the reply.

11. A non-transitory computer-readable recording medium having stored therein a control program for causing a computer as an information processing apparatus to execute a process, the process comprising:
upon receipt of a connection request from a terminal device, executing a connection process establishing a connection between the terminal device and the information processing apparatus;
notifying the terminal device of scheduled time of release of the connection established by the connection process; and
determining whether the current time has passed the scheduled time for every predetermined time and releasing the connection established between the terminal device and the information processing apparatus in a case where the current time is determined to have passed the scheduled time,
wherein the connection includes an exclusive lock of a shared resource of the information processing apparatus, the exclusive lock of the shared resource being requested from the terminal device, and
wherein the releasing of the connection includes a releasing of the exclusive lock of the shared resource requested from the terminal device.

12. The non-transitory computer-readable recording medium according to claim 11, wherein the process further comprises
managing the scheduled time in association with connection information relating to the terminal device,
determining whether the current time has passed the scheduled time for every predetermined time, and
invalidating the connection information in a case where the current time is determined to have passed the scheduled time.

13. The computer-readable recording medium according to claim 11, wherein the process further comprises, upon receipt of the connection request or a request other than the connection request from the terminal device, acquiring scheduled time by adding a predetermined time to the current time and managing the acquired scheduled time in association with the connection information relating to the terminal device.

14. The computer-readable recording medium according to claim 11, wherein the process further comprises, upon receipt of the connection request or a request other than the connection request from the terminal device, including the scheduled time in a reply to the connection request or the request and notifying the terminal device of the reply.

* * * * *